(12) United States Patent
Arakawa

(10) Patent No.: US 8,359,444 B2
(45) Date of Patent: Jan. 22, 2013

(54) SYSTEM AND METHOD FOR CONTROLLING AUTOMATED PAGE-BASED TIER MANAGEMENT IN STORAGE SYSTEMS

(75) Inventor: Hiroshi Arakawa, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 712 days.

(21) Appl. No.: 12/237,204

(22) Filed: Sep. 24, 2008

(65) Prior Publication Data
US 2010/0077168 A1    Mar. 25, 2010

(51) Int. Cl.
*G06F 12/02*    (2006.01)
(52) U.S. Cl. ........ 711/165; 711/117; 711/161; 711/162; 714/6.2
(58) Field of Classification Search .................. 711/165, 711/161, 162, 117; 714/6.2
See application file for complete search history.

(56) References Cited

U.S. PATENT DOCUMENTS

| | | | |
|---|---|---|---|
| 5,247,638 A | 9/1993 | O'Brien et al. | |
| 7,130,960 B1 | 10/2006 | Kano | |
| 7,257,684 B1 * | 8/2007 | Sinha et al. | 711/154 |
| 7,747,799 B2 | 6/2010 | Nakagawa et al. | |
| 7,822,939 B1 | 10/2010 | Veprinsky et al. | |
| 7,949,637 B1 | 5/2011 | Burke | |
| 2001/0024386 A1 * | 9/2001 | Harari et al. | 365/200 |
| 2001/0054131 A1 * | 12/2001 | Alvarez et al. | 711/105 |
| 2004/0199515 A1 * | 10/2004 | Penny et al. | 707/10 |
| 2004/0230766 A1 * | 11/2004 | Cameron | 711/203 |
| 2006/0004968 A1 | 1/2006 | Vogt | |
| 2006/0010002 A1 * | 1/2006 | Kunde et al. | 705/1 |
| 2006/0010169 A1 * | 1/2006 | Kitamura | 707/200 |
| 2006/0155950 A1 * | 7/2006 | Smith | 711/171 |
| 2006/0242431 A1 | 10/2006 | LeCrone et al. | |
| 2008/0282047 A1 | 11/2008 | Arakawa et al. | |
| 2009/0144496 A1 | 6/2009 | Kawaguchi | |
| 2009/0319772 A1 | 12/2009 | Singh et al. | |

OTHER PUBLICATIONS

Automated Tiered Storage Systems, Data Progression, Compellent, http://www.compellent.com/Products/Software/Automated-Tiered-Storage.aspx, 2008.

* cited by examiner

*Primary Examiner* — Jae Yu
(74) *Attorney, Agent, or Firm* — Mattingly & Malur, PC

(57) ABSTRACT

System and method for automated page-based management in storage systems. The system includes host computers, file servers and a storage system having automated page-based management means. The storage system interface receives instructions to change the condition for decision for migration regarding particular parts or the whole volume. The host computer can control execution of the migration performed by the storage system by specifying areas or volumes with the condition via the interface. Highly optimized, appropriate data placement and data relocation in computer system can be achieved when the application, host computer or management computer can recognize or predict the usage of the data or files. The storage system having automated page-based management may include compression/decompression and a control method for the compression and decompression process.

64 Claims, 27 Drawing Sheets

201

| TPV ID | Segment ID | Assigned | Tier | Pool Volume ID | Chunk ID | Under migration |
|---|---|---|---|---|---|---|
| 0 | 0 | Yes | 1 | 12 | 56 | No |
|   | 1 | No | - | - | - | - |
|   | 2 | Yes | 2 | 23 | 29 | No |
|   | : |   |   |   |   |   |
| 1 | 0 | Yes | 1 | 31 | 77 | No |
|   | 1 | Yes | 1 | 22 | 90 | Yes |
|   | 2 | No | - | - | - | - |
|   | : |   |   |   |   |   |
| : |   |   |   |   |   |   |

| Pool Volume ID | Chunk ID | Tier | Usage | TPV ID | Segment ID |
|---|---|---|---|---|---|
| 0 | 0 | 1 | In Use | 14 | 35 |
|   | 1 | 1 | Free | - | - |
|   | 2 | 1 | In Use | 53 | 46 |
|   | : |   |   |   |   |
|   | 4096 | 2 | Free | - | - |
|   | 4097 | 2 | Free | - | - |
|   | : |   |   |   |   |
| 1 | 0 | 3 | In Use | 24 | 54 |
|   | 1 | 3 | In Use | 32 | 74 |
|   | 2 | 3 | Free | - | - |
|   | : |   |   |   |   |
| : |   |   |   |   |   |

Fig. 5

| Data name | Type | Expected service level | Expected latency |
|---|---|---|---|
| File_A | DB | High | 100us |
| File_B | CAD data | Middle | 1000us |
| File_C | Web data | Low | 10ms |
| : | | | |

| Project ID | Related data | Term | Expected service level |
|---|---|---|---|
| 0 | File_A, File_B, File_C | 2008/4/1 0:00 – 2008/9/30 23:59 | High |
| | | 2008/10/1 0:00 – 2009/3/31 23:59 | Middle |
| | | : | : |
| 1 | File_D, File_E, File_F, File_G | From 20th to 31st in every month | Middle |
| | | From 1st to 19th in every month | Low |
| | | | |
| : | | | |

Fig. 8

| Data name | Term | Expected service level | Expected latency |
|---|---|---|---|
| File A | 2008/4/1 0:00 – 2008/9/30 23:59 | High | 100us |
| | 2008/10/1 0:00 – 2009/3/31 23:59 | Middle | 1000us |
| | | | |
| File B | From 20th to 31st in every month | Middle | 1000us |
| | From 1st to 19th in every month | Low | 10ms |
| | | | |
| : | | | |

Fig. 9

| TPV ID | Segment ID | Read / Write | Access rate per unit time | Last access time | Average access length |
|---|---|---|---|---|---|
| 0 | 0 | Read | 15 | 2008/05/07 22:33:59.992 | 4096 |
| | | Write | 4024 | 2008/05/08 02:26:12.005 | 4096 |
| | 1 | Read | 2305 | 2008/05/08 01:02:10.100 | 1048576 |
| | | Write | 67 | 2008/05/07 23:40:01.090 | 1048576 |
| | : | | | | |
| : | : | | | | |

Fig. 13

| Migration Type | Condition 1 | | Condition 2 |
|---|---|---|---|
| From Tier 1 to Tier 2 | Access rate per unit time < 1500 | AND | Last access time is earlier than 10 days ago |
| From Tier 2 to Tier 1 | Access rate per unit time > 3000 | AND | Access Length < 16384 |
| From Tier 2 to Tier 1 | Access rate per unit time > 1500 | AND | Access Length >= 16384 |
| : | | | |

| TPV ID | Segment ID | Prohibition of Migration | Adjustment | | |
|---|---|---|---|---|---|
| | | | Read / Write | Access rate per unit time | Last access time |
| 0 | 0 | No | Read | 1000 | - |
| | | | Write | 1000 | - |
| | 1 | No | Read | - | -2 days |
| | | | Write | - | -2 days |
| | 2 | No | Read | - | - |
| | | | Write | - | - |
| | ⋮ | | | | |
| | 100 | Yes | Read | - | - |
| | | | Write | - | - |
| | ⋮ | | | | |
| ⋮ | ⋮ | | | | |

| TPV ID | Prohibition of Migration | Adjustment | | |
|---|---|---|---|---|
| | | Read / Write | Access rate per unit time | Last access time |
| 0 | No | Read | -1000 | - |
| | | Write | -1000 | - |
| 1 | No | Read | - | 3 days |
| | | Write | - | 3 days |
| 2 | No | Read | - | - |
| | | Write | - | - |
| ⋮ | | | | |
| 100 | Yes | Read | - | - |
| | | Write | - | - |
| ⋮ | | | | |

Fig. 16

| TPV ID | Segment ID | Destination | | Copy pointer |
|---|---|---|---|---|
| | | Pool Volume ID | Chunk ID | |
| 0 | 0 | 27 | 28 | 204800 |
| 2 | 1 | 11 | 18 | 489600 |
| : | | | | |

| TPV ID | Segment ID | Assigned | Tier | Compression | Pool Volume ID | Chunk ID | Start Address | Length |
|---|---|---|---|---|---|---|---|---|
| 0 | 0 | Yes | 1 | No | 12 | 56 | 0 | 44040192 |
| | 1 | No | - | - | - | - | - | - |
| | 2 | Yes | 3 | Yes | 23 | 29 | 16777216 | 11010048 |
| | : | | | | | | | |
| 1 | 0 | Yes | 1 | No | 31 | 77 | 0 | 44040192 |
| | 1 | Yes | 1 | No | 22 | 90 | 0 | 44040192 |
| | 2 | No | - | - | - | - | - | - |
| | : | | | | | | | |
| : | | | | | | | | |

Fig. 27

| Pool Volume ID | Chunk ID | Tier | Usage | Number of Segments | TPV ID | Segment ID |
|---|---|---|---|---|---|---|
| 0 | 0 | 1 | In Use | 1 | 14 | 35 |
| | 1 | 1 | Free | - | - | - |
| | 2 | 1 | In Use | 1 | 53 | 46 |
| | : | | | | | |
| | 4096 | 2 | Free | - | - | - |
| | 4097 | 2 | Free | - | - | - |
| | : | | | | | |
| 1 | 0 | 3 | In Use | 2 | 24 | 54 |
| | | | | | 5 | 23 |
| | 1 | 3 | In Use | 3 | 32 | 74 |
| | | | | | 7 | 8 |
| | | | | | 18 | 44 |
| | 2 | 3 | Free | - | - | - |
| | : | | | | | |
| : | | | | | | |

Fig. 28

| TPV ID | Segment ID | Assigned | Tier | Compression | Number of Chunk | Pool Volume ID | Chunk ID | Start Address | Length |
|---|---|---|---|---|---|---|---|---|---|
| 0 | 0 | Yes | 1 | No | 1 | 12 | 56 | 0 | 44040192 |
| | 1 | No | - | - | - | - | - | - | - |
| | 2 | Yes | 3 | Yes | 1 | 23 | 29 | 16777216 | 11010048 |
| | : | | | | | | | | |
| 1 | 0 | Yes | 1 | No | 1 | 31 | 77 | 0 | 44040192 |
| | 1 | Yes | 1 | No | 1 | 22 | 90 | 0 | 44040192 |
| | 2 | No | - | - | - | - | - | - | - |
| | 3 | Yes | 3 | Yes | 2 | 42 | 54 | | |
| | | | | | | 35 | 62 | 0 | |
| : | : | | | | | | | | |

| TPV ID | Segment ID | Prohibition of Compression | Prohibition of Migration | Adjustment | | |
|---|---|---|---|---|---|---|
| | | | | Read / Write | Access rate per unit time | Last access time |
| 0 | 0 | No | No | Read | 1000 | - |
| | | | | Write | 1000 | - |
| | 1 | No | No | Read | - | -2 days |
| | | | | Write | - | -2 days |
| | 2 | Yes | No | Read | - | - |
| | | | | Write | - | - |
| | ⋮ | | | | | |
| | 100 | No | Yes | Read | - | - |
| | | | | Write | - | - |
| | ⋮ | | | | | |
| ⋮ | ⋮ | | | | | |

| TPV ID | Prohibition of Compression | Prohibition of Migration | Adjustment | | |
|---|---|---|---|---|---|
| | | | Read / Write | Access rate per unit time | Last access time |
| 0 | No | No | Read | -1000 | - |
| | | | Write | -1000 | - |
| 1 | No | No | Read | - | 3 days |
| | | | Write | - | 3 days |
| 2 | Yes | No | Read | - | - |
| | | | Write | - | - |
| ⋮ | | | | | |
| 100 | No | Yes | Read | - | - |
| | | | Write | - | - |
| ⋮ | | | | | |
| ⋮ | | | | | |

Fig. 35

SYSTEM AND METHOD FOR CONTROLLING AUTOMATED PAGE-BASED TIER MANAGEMENT IN STORAGE SYSTEMS

FIELD OF THE INVENTION

This invention relates in general to methods and systems for providing storage to information systems and, more particularly, to controlling automated page-based tier management in storage systems.

DESCRIPTION OF THE RELATED ART

Hierarchical storage management also called tier management is a storage management method designed for improving utilization of storage resources in computer systems. Specifically, the utilization of resources is optimized by changing the location of data in a computer system based on the value and usage of the data in the enterprise. On the other hand, the analysis and classification of the aforesaid value and the usage are generally difficult tasks. Therefore, recently some storage system vendors proposed automated page-based hierarchical storage management performed by the storage system itself. With this function, the storage system itself monitors access characteristics of each small data storage area, such as a page, in a data storage volume, or a file system region, and automatically relocates the data in the page based on the detected access characteristics. The data relocation is performed regardless of the usage of the data in the host or application side.

For example, U.S. Patent Application Publication Number 2006/0010169, to Kitamura, incorporated herein by reference, discloses a hierarchical file storage management performed by a file server, which is achieved by means of page relocation capability of the storage system. In addition, Compellent Technologies, Inc. provides storage system products having the automated page-based management or automated tier management capability mentioned above. A description of such storage products may be found at http://www.compellent.com/Products/Software/Automated-Tiered-Storage.aspx.

The above automated page-based management solves the difficulty of using conventional hierarchical storage management by avoiding the need to classify the data or the files. However, in some situations, this process, which is performed automatically by the storage system, fails to achieve the optimal data relocation result because it ignores the actual usage of the data by the user application, even if, in some cases, the application, host computer or management computer can recognize or predict the usage of the data or files.

SUMMARY OF THE INVENTION

Therefore, there is a need for a method and apparatus to control the automated page-based management function performed by storage system according to the actual usage of the stored data or files by the application or the host computer. Therefore, the inventive methodology is directed to methods and systems that substantially obviate one or more of the above and other problems associated with conventional techniques by controlling the automated page-based management of storage systems.

In accordance with one aspect of the inventive methodology, there is provided a computerized storage system including a computer and a storage system operatively coupled to the computer. The storage system incorporates at least one storage device configured to store data in at least one data storage volume, the data storage volume having a first tier segment and a second tier segment, and a storage controller, the storage controller including a data migration module configured to automatically migrate a data unit between the first tier segment and the second tier segment in accordance with data usage based on at least one migration condition. The storage controller of the inventive system further includes an interface configured to enable a change of the at least one migration condition with respect to at least a part of the data stored in the data storage volume.

In accordance with another aspect of the inventive methodology, there is provided a computer-implemented method performed in a computerized storage system including a computer; and a storage system operatively coupled to the computer. The storage system incorporates at least one storage device configured to store data in at least one data storage volume, which includes a first tier segment and a second tier segment. The inventive method involves automatically migrating a data unit between the first tier segment and the second tier segment in accordance with data usage based on at least one migration condition and enabling a change of the at least one migration condition with respect to at least a part of the data stored in the data storage volume.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 4 shows an exemplary mapping information table, according to aspects of the present invention pertaining to the first embodiment.

FIG. 5 shows an exemplary pool information table, according to aspects of the present invention pertaining to the first embodiment.

FIG. 6 shows a flowchart of an exemplary control method, according to aspects of the present invention pertaining to the first embodiment.

FIG. 7, FIG. 8 and FIG. 9 show three examples of data usage policy information, according to aspects of the present invention pertaining to the first embodiment.

FIG. 13 shows an example of access information according to aspects of the present invention pertaining to the first embodiment.

FIG. 14 shows an example of migration condition information according to aspects of the present invention pertaining to the first embodiment.

FIG. 15 shows an example of page information according to aspects of the present invention pertaining to the first embodiment.

FIG. 16 shows an example of volume information according to aspects of the present invention pertaining to the first embodiment.

FIG. 18 shows a flowchart of an exemplary process for changing migration settings for a volume, according to aspects of the present invention pertaining to the first embodiment.

FIG. 19 shows a flowchart for an exemplary process of setting adjustment values in volume information, according to aspects of the present invention pertaining to the first embodiment.

FIG. 20 shows a flowchart of an exemplary process for changing migration settings for a segment, according to aspects of the present invention pertaining to the first embodiment pertaining to the first embodiment.

FIG. 21 shows a flowchart for an exemplary process of setting adjustment values in page or segment information, according to aspects of the present invention pertaining to the first embodiment.

FIG. 27 shows an exemplary mapping information for use with the system configuration according to the second embodiment of the present invention.

FIG. 28 shows an exemplary pool information for use with the system configuration according to the second embodiment of the present invention.

FIG. 33 shows an exemplary mapping information corresponding to the method of FIG. 32, according to the second embodiment of the present invention.

FIG. 34 and FIG. 35 show exemplary page information and volume information according to the second embodiment of the present invention.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Aspects of the present invention provide systems and methods for controlling automated page-based migration in storage system.

Figure 1:
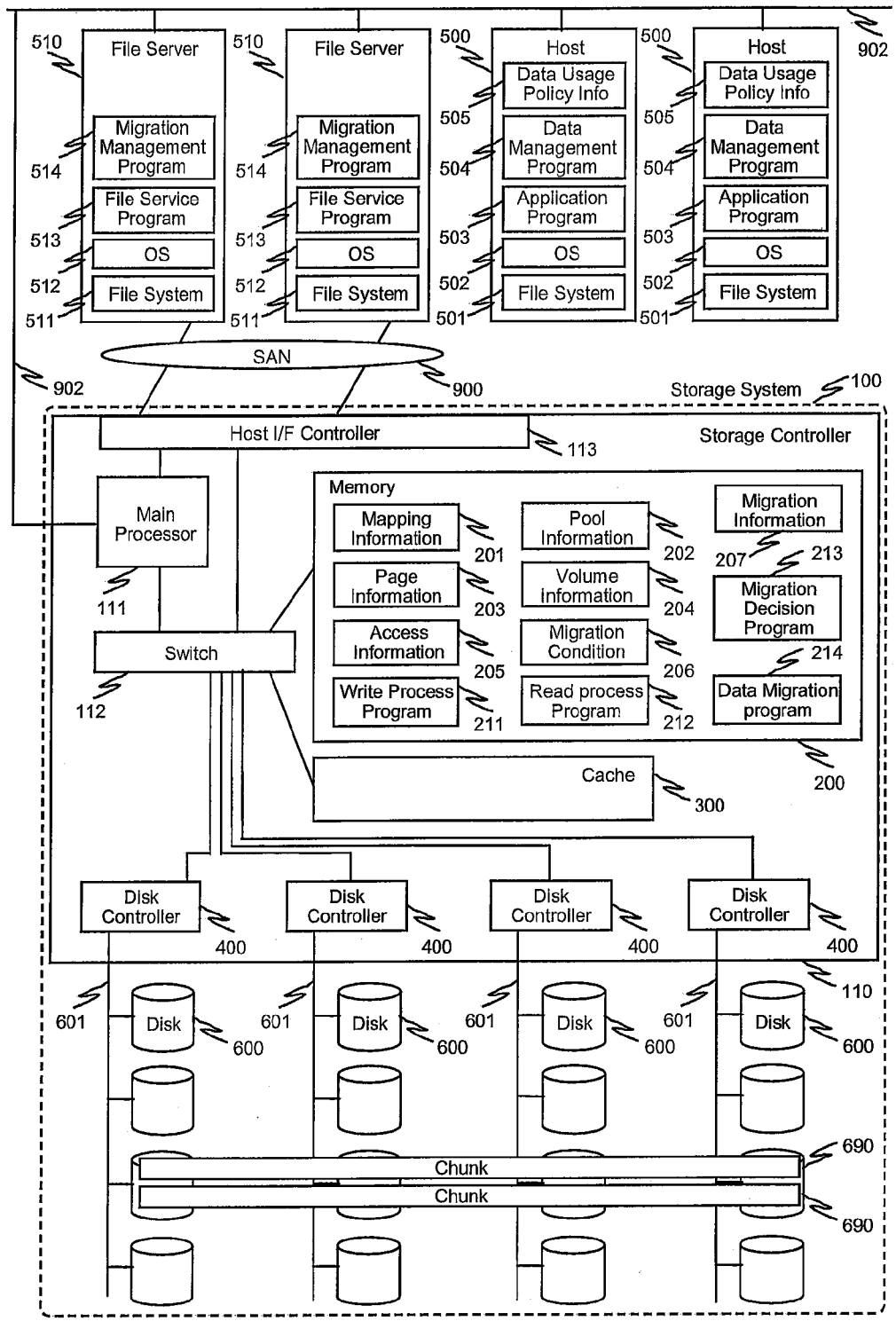
FIG. 1 shows a system configuration according to aspects of the present invention pertaining to a first embodiment.

FIG. 1 shows an exemplary system configuration according to aspects of the present invention pertaining to a first embodiment of the inventive methodology. The storage system of FIG. 1 may include some or all of the following components: storage system 100, storage controller 110, main processor 111, switch 112, host interface 113, memory 200, cache 300, disk controller 400, storage disk 600 such as hard disk drive (HDD), and backend path 601, which can be implemented using a variety of interconnect technologies, including Fibre Channel, SATA, SAS, iSCSI(IP), or the like. In an embodiment of the invention, the storage disk 600 and disk controller 400 can replaced by Solid State Device such as flash memory and a controller controlling them.

The main processor 101 executes various processes necessary for the operation of the storage controller 100. The main processor 101 and other components use the following information stored in the memory 200: mapping information 201, pool information 202, page information 203, volume information 204, access information 205, migration condition 206, and migration information 207.

The main processor 101 performs the aforesaid processes by executing the following programs stored in the memory 200. The programs stored in the memory 200 include a read process program 211, a write process program 212, a migration decision program 213 and a data migration program 214. The details of these programs will be described in detail below.

The file servers 510 are coupled to the host interface 113 via SAN 900 that may be implemented using various types of technologies, including Fibre Channel, iSCSI(IP) or the like. The host 500, file server 510 and storage controller 110 are coupled each other via LAN 902, which may be implemented as an IP network.

Volumes, namely logical units (LUs), provided by the storage system 100, are composed from collection of physical storage areas in the HDDs. The integrity of the data stored in those areas may be protected by means of a stored parity code, such as in RAID configuration, well known to persons of skill in the art.

In addition to the file system 501 and the OS 502, the host 500 stores an application program 503, a data management program 504 and data usage policy information 505. To execute these programs, the host 500 also incorporates resources such as a processor, memory, and storage devices, which are not shown in FIG. 1. The details of these programs will be described in detail below. The file server 510 includes a file system 511, OS 502, file service program 513 and migration management program 514. To properly execute these programs, the file server 510 also includes resources such as processor, memory and storage devices, which are not shown in FIG. 1. The details of these programs will be described in detail below.

Figure 2:
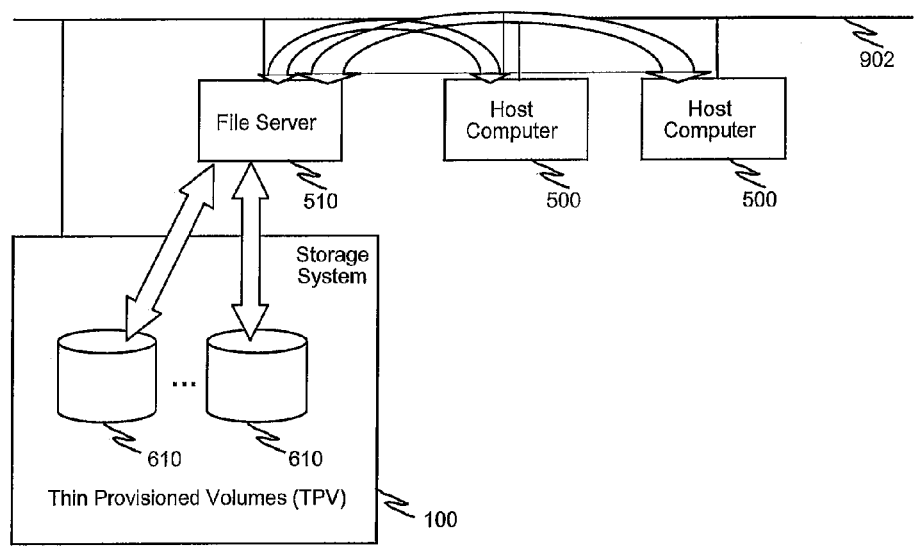
FIG. 2 shows an overview of a method of providing volumes, according to aspects of the present invention pertaining to the first embodiment.

FIG. 2 shows an overview of an exemplary method for provisioning and using data volumes in the storage system 100. The storage system 100 provides thin provisioned volumes (TPV) 610 as a data storage area for the file server 510. The file server 510 performs read and write access operations to use and store the data in the TPV 610 via the SAN 900, while the host computer 500 performs various file access operations including read and write operations with respect to the files managed by the file server 510 via the LAN 902. The file server 510 processes the requests from the host computers 500 by using the file service program 513.

Figure 3:
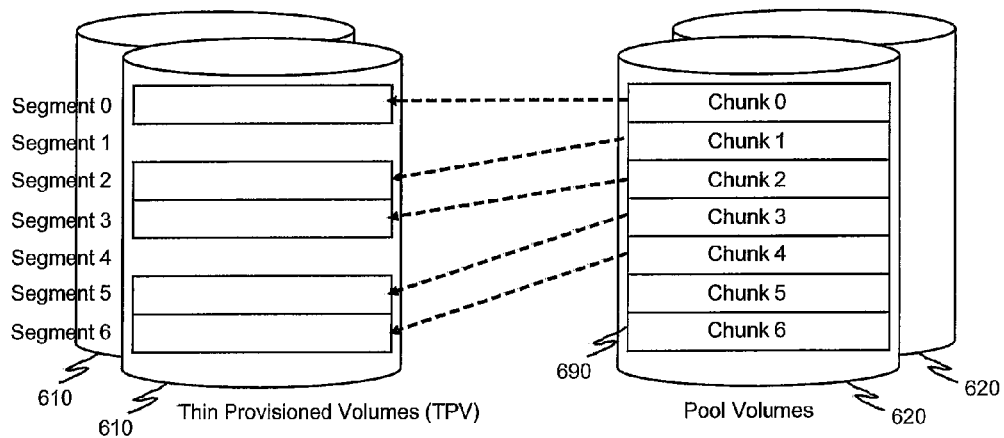
FIG. 3 shows an exemplary structure and method for providing thin provisioned volumes, according to aspects of the present invention pertaining to the first embodiment.

FIG. 3 shows an exemplary structure and method for providing thin provisioned volumes, according to aspects of the present invention pertaining to the first embodiment. The storage system 100 includes pool volumes 620 and subdivides the pool volumes 620 into a number of fixed-length areas called chunks 690. The storage system 100 assigns a chunk 690 to a segment of a virtual volume or a TPV 610 at the time a write access to the target segment is performed. In other words, the physical storage area is assigned on demand. In FIG. 3, the TPV 610 virtually includes multiple segments and a chunk 690 is allocated from the pool volume 620 and assigned to the appropriate segment. A segment is a fixed length area or a page of the TPV. For example, the chunk 4 is assigned to the segment 6 as shown in FIG. 3. That is, a TPV 610 is a page-based volume.

To achieve assignment of chunks to segments of the TPV, the storage controller 110 uses mapping information 201 (FIG. 4) and pool information 202 (FIG. 5). FIG. 4 is an example of mapping information 201. This information maintains mapping between chunks and segments of each volume. Status of assignment is 'No' if no chunk is assigned to the segment. The tier that the segment belongs to at that time is indicated in 'Tier' section. A usage of flag of "under migration" is described later. This information can be constructed as a list or a directory of each element for faster search.

FIG. 5 shows an exemplary pool information table, according to aspects of the present invention pertaining to the first embodiment. The pool information 202 is used to manage and determine whether a chunk is used or not. By using this information, the storage controller 110 is able to find free (unused) chunks in the write process described below. The tier that the chunk belongs to at that time is indicated in the 'Tier' section. This information can also be constructed as a list or directory of each element for faster search of a free chunk.

As shown in U.S. Patent Publication No. 2006/0010169, incorporated herein by reference, the storage system 100 can realize page-based transparent data migration between chunks by copying data and changing the mapping information 201. As described below, the page-based transparent migration mentioned above is managed by the storage system 100 itself by way of an automated tier management. However, according to aspects of the present invention, the host 500 can control this management process according to the data usage policy of the host 500.

Figures 6, 7:
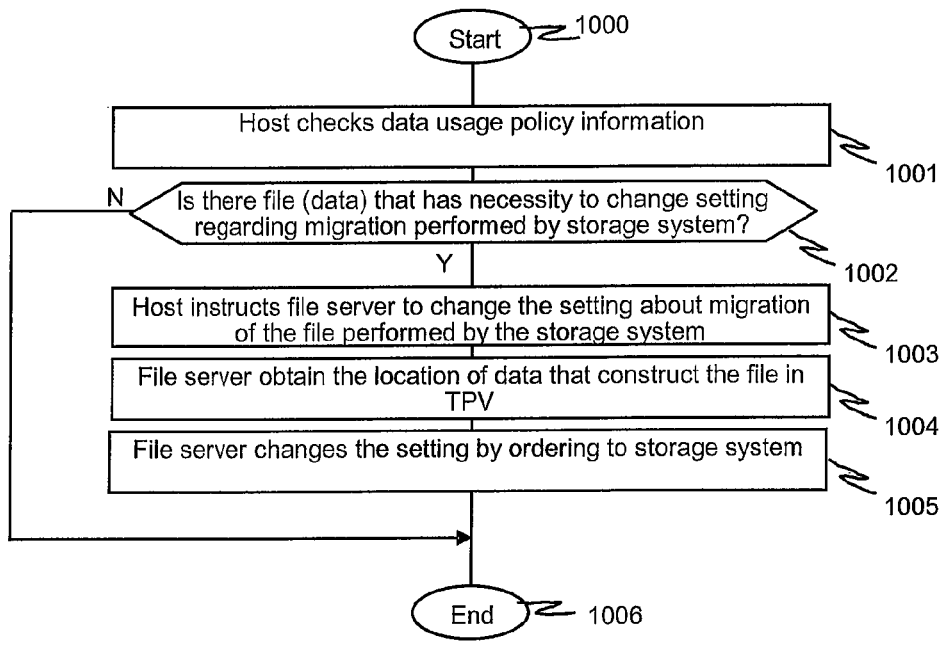

FIG. 6 shows a flowchart of an exemplary control method, according to aspects of the present invention pertaining to the first embodiment. The process begins at 1000. At 1001, the host 500 checks the current data usage policy information 505. This information is set by user or generated by the host 500 itself as information showing a plan or forecast of usage of the data or file.

At 1002, if there are one or more files that have necessity to change setting regarding migration performed by the storage system 100, the process proceeds to 1003. Otherwise, the process terminates at 1006.

At 1003, the host 500 instructs the file server 510 to change the setting with respect to the migration of the data or the file performed by the storage system 100 with respect to the target file.

Figure 10:
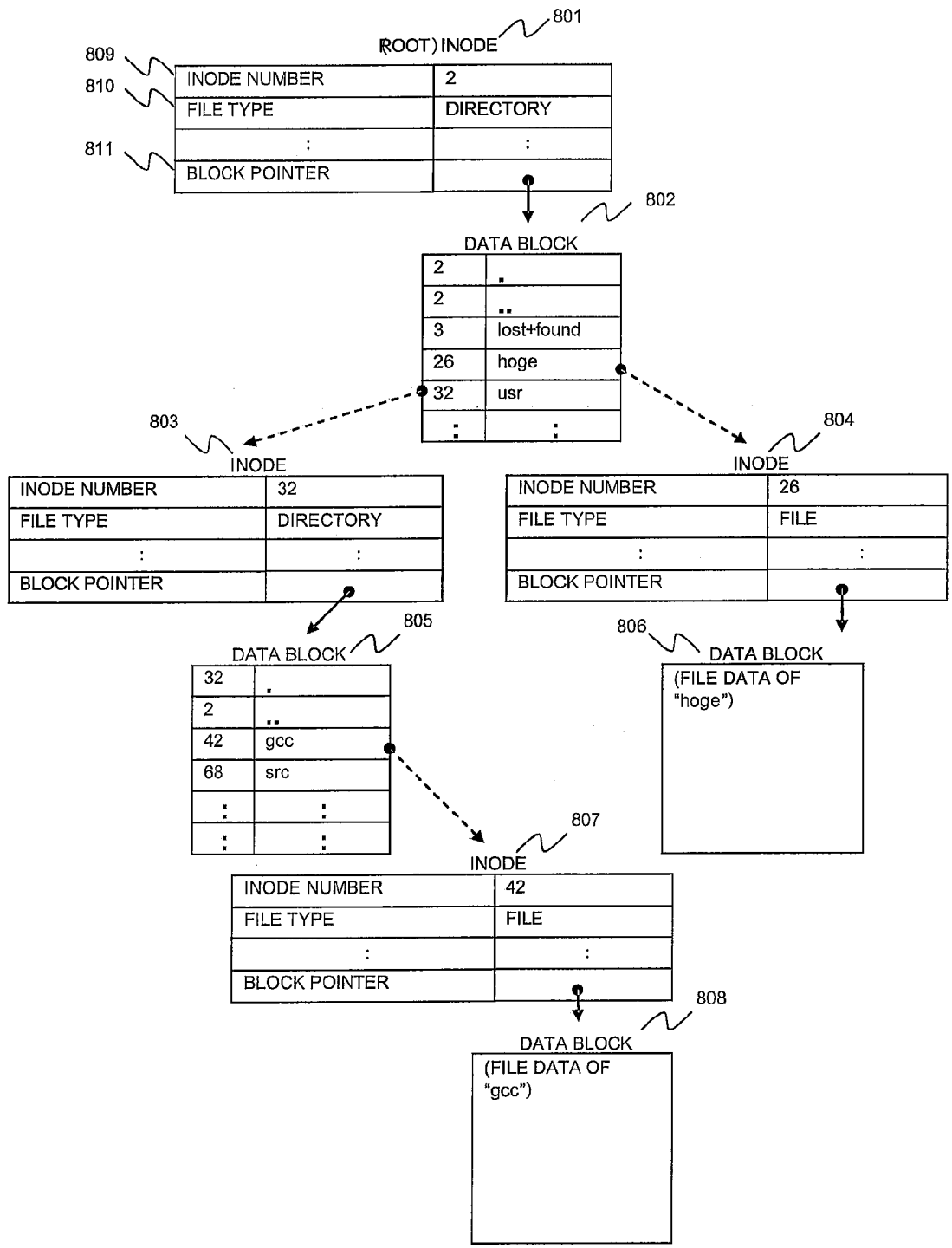
FIG. 10 shows an exemplary data structure of file system.

At 1004, the file server 510 obtains the location of the data in the TPV 610 corresponding to the specified file. FIG. 10 shows an example of file system data structure. Each INODE in FIG. 10 can be used to indicate a file or directory. The INODE indicates a file when its FILE TYPE field is "file" such as 804 and 807. If the INODE indicates a file, then the data blocks pointed from block pointer in the INODE contain actual data of the file. If a file is stored in a plurality of data blocks, for example in 10 blocks, the addresses of the 10 data blocks are recorded in block pointer. The INODE indicates a directory if the FILE TYPE field is "directory" such as 801 and 803. If the INODE indicates a directory, then the data blocks pointed from block pointer in the INODE stores the list of INODE numbers and names of all files and directories that reside in the directory. This list is called directory entry. These types of information used to manage files are stored in volumes in the storage system 100 according to a predetermined placement rule. Therefore, the file sever 510 can obtain information on the location of the data by tracing such information stored in the TPV 610.

At 1005, the file server 510 changes the setting by instructing the storage system 100 to change the location of the data and specifies the target location. The process performed in the storage system 100 in response to this request is described below.

There are several situations when the host 500 should control the tier management performed by the storage system 100. These situations are related to usage policy offered by the application or the user. Examples of these situations will be described below.

As would be appreciated by those of skill in the art, the priority or required service level of data is determined by the host 500. In this case, the host 500 can control or suggest appropriate relocation of the data or the file using a recognized projection of the specifics of the data utilization.

FIG. 7, FIG. 8 and FIG. 9 show three examples of data usage policy information, according to aspects of the present invention pertaining to the first embodiment. Specifically, FIG. 7 illustrates an example of the data usage policy information 505 that resides on the host computer 500. In this example, type, expected service level and expected latency of each file at a particular time are maintained and updated by the application program 503 or by the user, if necessary. Therefore, the data management program 504 can suggest a setting for relocation by referring to the information 505 at each point in time.

FIG. 8 shows another example of the data usage policy information 505. In this example, the data are arranged by project ID and files used in each project performed by the host 500 are shown. For each project ID, expected service level and planned or forecasted duration of the project are also shown. By referring to the information in the table of FIG. 8, the host 500 can recognize usage and requirements of the files in the future and make a suggestion for data or file relocation.

FIG. 9 shows yet another example of data usage policy information 505. In this example, expected service level and latency of each file are presented together with the respective term, which can be based on a plan or a forecast.

As another example of the situation when the host 500 should control the tier management performed by the storage system 100, the data is relocated by means other than the storage system 100. An example of a system configuration where a file server 510 includes a file migration program 515 is shown in FIG. 25.

Figure 25:
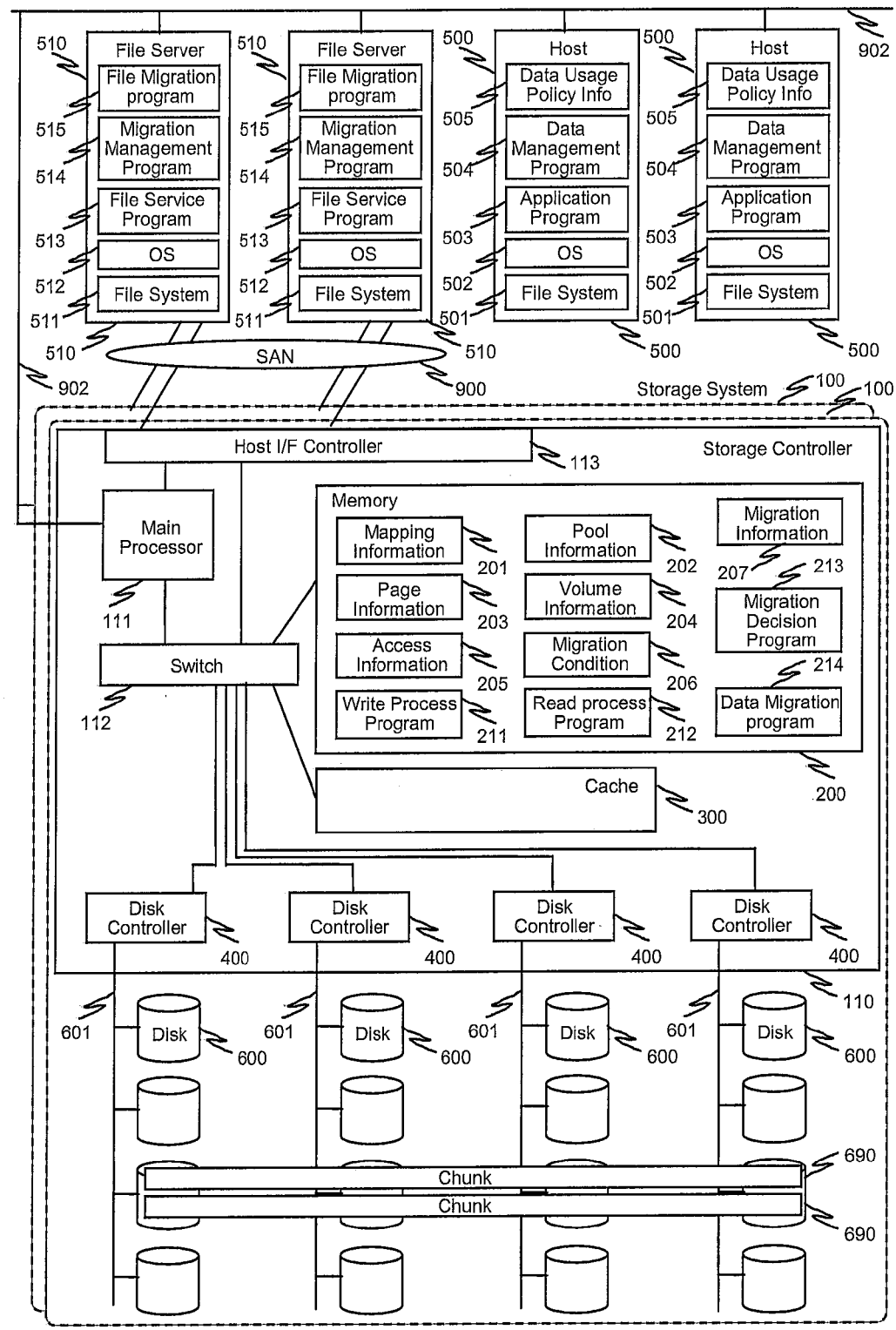
FIG. 25 shows yet another system configuration according to aspects of the present invention pertaining to the first embodiment.

FIG. 25 shows an example of an alternative system configuration where a file server 510 additionally includes a file migration program 515. With this system configuration, a file can be relocated by the file server 510 instead of the storage system 100 when the migration is performed directly, when multiple files are relocated simultaneously or when an entire database file is relocated simultaneously. Moreover, the file server 510 can relocate a file even if migration among the storage systems 100 is required. The alternative configuration of FIG. 25 permits the data to be relocated by means other than the storage system 100. In this situation, it is preferable that tier management of the storage system 100 can be controlled from the host 500 or the file server 510a.

Figure 11:
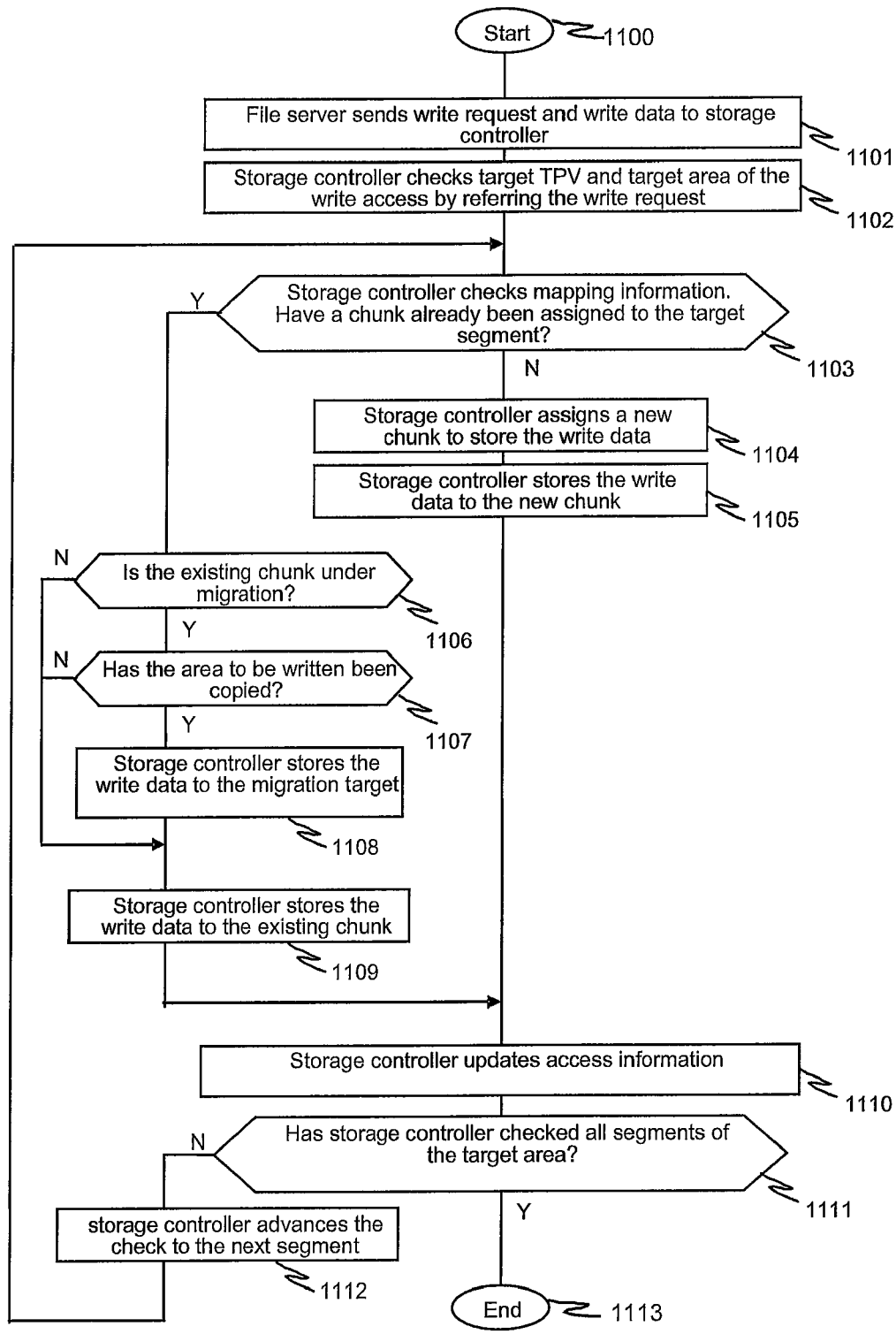
FIG. 11 shows a flowchart of an exemplary write process for the TPV, according to aspects of the present invention pertaining to the first embodiment.

FIG. 11 shows a flowchart of an exemplary write process for the TPV, according to aspects of the present invention pertaining to the first embodiment. The process beings at 1100.

At 1101, the file server 510 issues a write request and transfers write data to the storage controller 110.

At 1102, the storage controller 110 checks the target TPV 610 and target area of the write access by referring to the write request.

At 1103, the storage controller 110 checks the mapping information 201 for a segment in the target area. If a chunk has already been assigned to the segment, the process proceeds to 1106. Otherwise, the process proceeds to 1104.

At 1104, the storage controller 110 assigns a new chunk to store the write data. To do this, the storage controller 110 updates the mapping information 201 and the pool information 202. By using the pool information 202, the storage controller 110 finds the new chunk from the highest tier, i.e. tier 1.

At 1105, the storage controller 110 stores the write data to the new chunk. Then, the process proceeds to 1110.

If a chunk has already been assigned to the segment and the process has proceeded to 1106, at 1106, the storage controller 110 checks 'under migration' flag in the mapping information 201. This flag is set during the migration process described later and shows whether the chunk is under migration or not. If the chunk is under migration, the process proceeds to 1107. Otherwise, the process proceeds to 1109.

At 1107, by referring to the migration information 207 described later, the storage controller 110 checks whether the area pertaining to the write command in the chunk has been copied during the migration process. If yes, the process proceeds to 1108. Otherwise, the process proceeds to 1109.

At 1108, the storage controller 110 stores the write data at the migration target.

At 1109, the storage controller 110 stores the write data at the existing chunk.

The process arrives at 1110 after the storage controller 110 stores the write data at the current chunk, at either 1105, where a new chunk is assigned, or 1109, where a pre-assigned chunk exists. At 1110, the storage controller 110 updates the access information 205. This access information records access characteristics of the segment (i.e. page) and is used for determination of migration as described later.

At 1111, if the storage controller 110 has checked all segments of the target area, the process ends at 1113. Otherwise, the storage controller 110 advances the check to the next segment at 1112.

Figure 12:
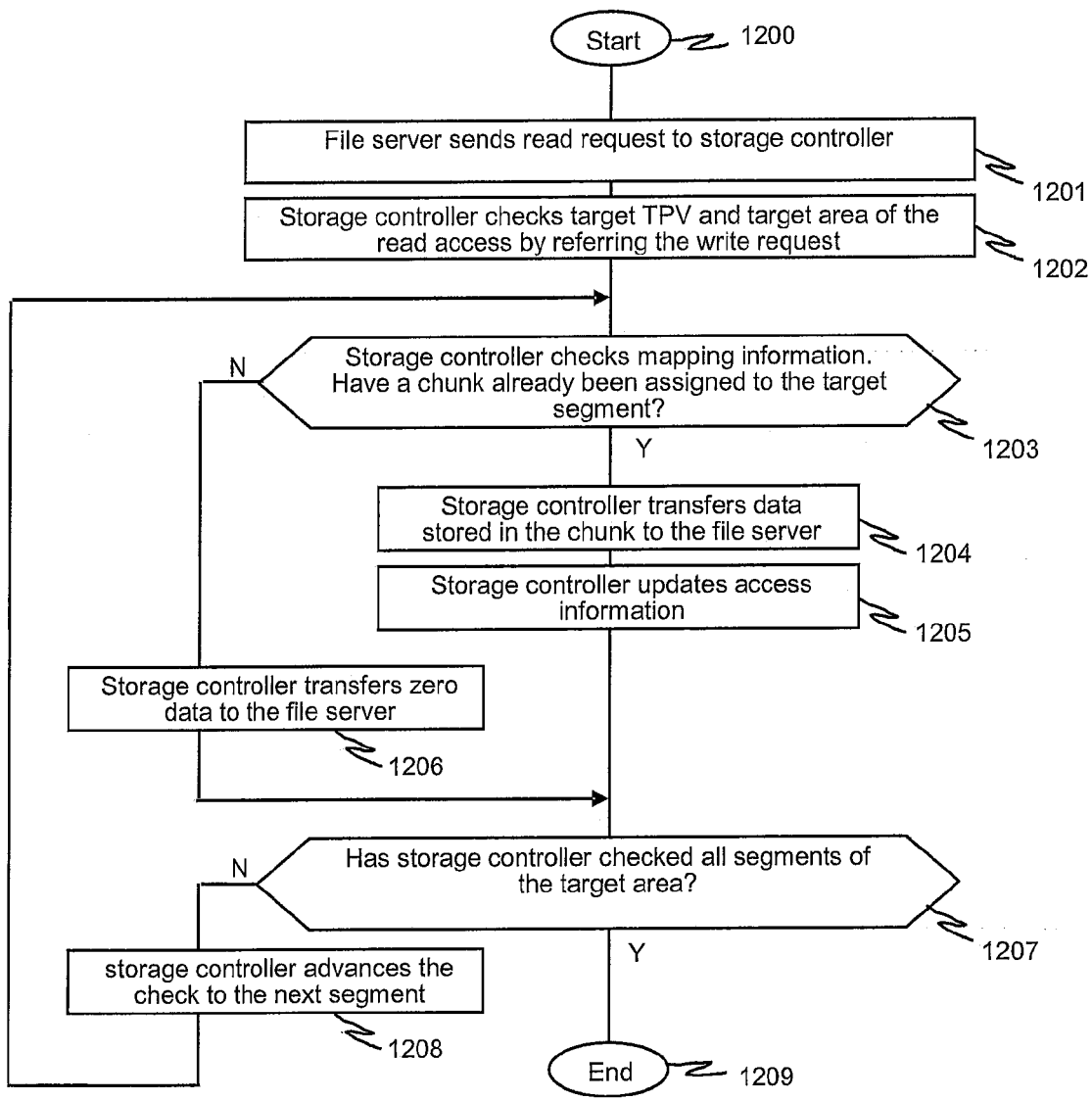
FIG. 12 shows a flowchart of an exemplary read process for the TPV, according to aspects of the present invention pertaining to the first embodiment.

FIG. 12 shows a flowchart of an exemplary read process for the TPV, according to aspects of the present invention pertaining to the first embodiment.

An exemplary write process for the TPV 610 begins at 1200.

At 1201, the file server 510 issues a read request to the storage controller 110.

At 1202, the storage controller 110 checks the target TPV 610 and target area of the read access by referring to the read request.

At 1203, the storage controller 110 checks the mapping information 201 for a segment in the target area. If a chunk has already been assigned to the segment, the process proceeds to 1204. Otherwise, the process proceeds to 1206.

At 1204, the storage controller 110 transfers the data stored in the chunk to the file server 510.

At 1205, the storage controller 110 updates the access information 205.

At 1206, the storage controller 110 sends data of zero (0) to the file server 510.

At 1207, if the storage controller 110 has checked all segments of the target area, the process ends at 1209. Otherwise, the storage controller 110 advances the check to the next segment at 1208.

FIG. 13 shows an example of access information according to aspects of the present invention pertaining to the first embodiment. Specifically, the access information 205 is stored in the memory 200 of the storage controller 110. The access information 205 includes information regarding access for each segment such as access rate per unit time, last access time and average access length, for each of the read and write requests. The information regarding the average access duration may be initialized at a certain interval. Accordingly, the average access length is reset to an initialized value at regular intervals.

FIG. 14 shows an example of migration condition information according to aspects of the present invention pertaining to the first embodiment. Specifically, FIG. 14 shows an example of the migration condition information 206 that is stored in the memory 200 of the storage controller 110. The migration condition information 206 is used by the flowchart of FIG. 17. The migration information maintains conditions that determine occurrence of migration for each movement between tiers. The condition may be registered by user via the host 500, the file server 510 and/or the management terminal of the storage system 100. The storage controller 110 can determine the occurrence of migration by referring to and comparing the values of the parameters listed in the migration condition information 206 and the conditions.

For example, according to the table shown, a migration type from tier 1 to tier 2 occurs if a first condition and a second condition are both met. The first condition in this case is an access rate per unit time of less than 1500 times and the second condition is that the last access time occurred before 10 days ago.

FIG. 15 shows an example of page information according to aspects of the present invention pertaining to the first embodiment. Specifically, FIG. 15 shows an example of the page information 203 located on the memory 200 of the storage controller 110. As described later, this information includes adjustment values for the determination and a flag showing prohibition of migration for each segment. For each TPV ID, the relevant segment IDs are listed. For each segment, a flag having values of YES or NO indicates whether migration is prohibited or not. Further, for each segment, an adjustment value may be separately provided for read and write requests. The adjustment is a function of whether the operation is read or write, access rate per unit time and last access time.

FIG. 16 shows an example of volume information according to aspects of the present invention pertaining to the first embodiment. Specifically, FIG. 16 shows an example of the volume information 204 located on the memory 200 of the storage controller 110. As described later, this information includes adjustment values for the determination and a flag showing prohibition of migration for each volume. This information is organized similarly to the information of FIG. 15 except that one value pertains to an entire volume as opposed to having values for each segment of a volume.

Figure 17:
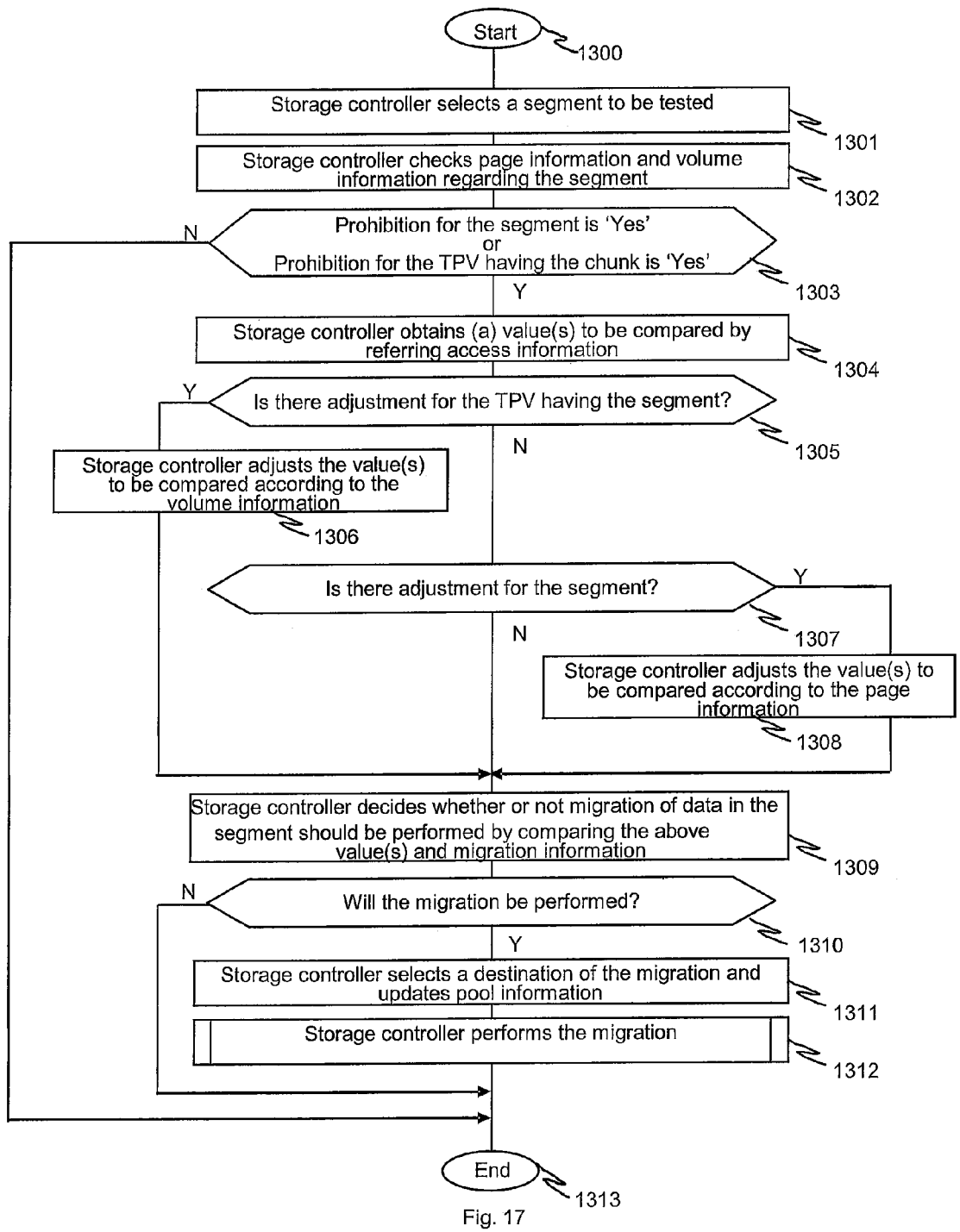
FIG. 17 shows an exemplary flowchart of a process of migration decision, according to aspects of the present invention pertaining to the first embodiment.

FIG. 17 shows an exemplary flowchart of a process of migration decision, according to aspects of the present invention pertaining to the first embodiment. Specifically, the process of FIG. 17 is for determining whether or not migration will be performed. During this process the values from table 205 are adjusted in accordance with the values in table 203 and subsequently used in comparison to arrive at a decision of whether migration of the page should occur and what type of migration should take place. The process begins at 1300. At 1301, the storage controller 110 chooses a segment (i.e. page) to be examined.

At 1302, the storage controller 110 investigates the page information 203 and the volume information 204. FIG. 15 and FIG. 16 show examples of the page information 203 and the volume information 204, respectively. As described below, this information includes adjustment values for the determination of migration and a flag showing prohibition of migration for each segment or volume.

At 1303, if prohibition of migration for the segment or the TPV is set to a YES value, the process ends at 1313. That is, migration is not performed. If there is no prohibition for migration, the process proceeds to 1304.

At 1304, by referring to the access information 205, the storage controller 110 obtains one or more values to be compared with the migration condition information 206.

At 1305, if according to the page information 203 there is adjustment for the TPV containing the segment, the process proceeds to 1306. Otherwise, the process proceeds to 1307.

At 1306, the storage controller 110 adjusts the values to be compared according to the adjustment provided in the volume information 204. That is, the adjustment value is added to the value to be compared. The adjustment values are obtained from the page information 203 and are used to modify or adjust the values provided by the access information 205. The adjusted or modified values are subsequently used against the migration condition information 206. And then, the process proceeds to 1309.

At 1307, if there is adjustment for the segment, the process proceeds to 1308. Otherwise, the process proceeds to 1309.

At 1308, the storage controller 110 adjusts the values to be compared according to the adjustment set in the page information 203. And then, the process proceeds to 1309.

At 1309, the storage controller 110 decides whether migration of data in the segment should be performed according to the conditions provided in the migration condition information 206. FIG. 14 shows an example of migration condition information 206. The storage controller 110 can determine the type of migration and whether or not migration should occur by comparing the adjusted values such as the access rate per unit time and the last access time with the values provided in the migration condition information 206.

At 1310, if the comparison indicates that migration should occur, the process proceeds to 1311. Otherwise, the process ends.

At 1311, the storage controller 110 finds the destination of the migration to the suitable tier determined from the conditions of FIG. 14 and updates the pool information 202 of FIG. 5.

At 1312, the storage controller 110 performs the migration. The detailed process of the migration is described below.

The above migration decision process is repeated at predetermined intervals or performed when load of the storage system 110 is low. This process is performed for segments that have stored data.

In examples of page information 203 and volume information 204 shown respectively in FIG. 15 and FIG. 16, the initial value of the prohibition of migration flag is 'NO' indicating that migration is not prohibited. The initial value of adjustments is zero or 'none'. These values subsequently change as the updates are performed.

Figure 18:
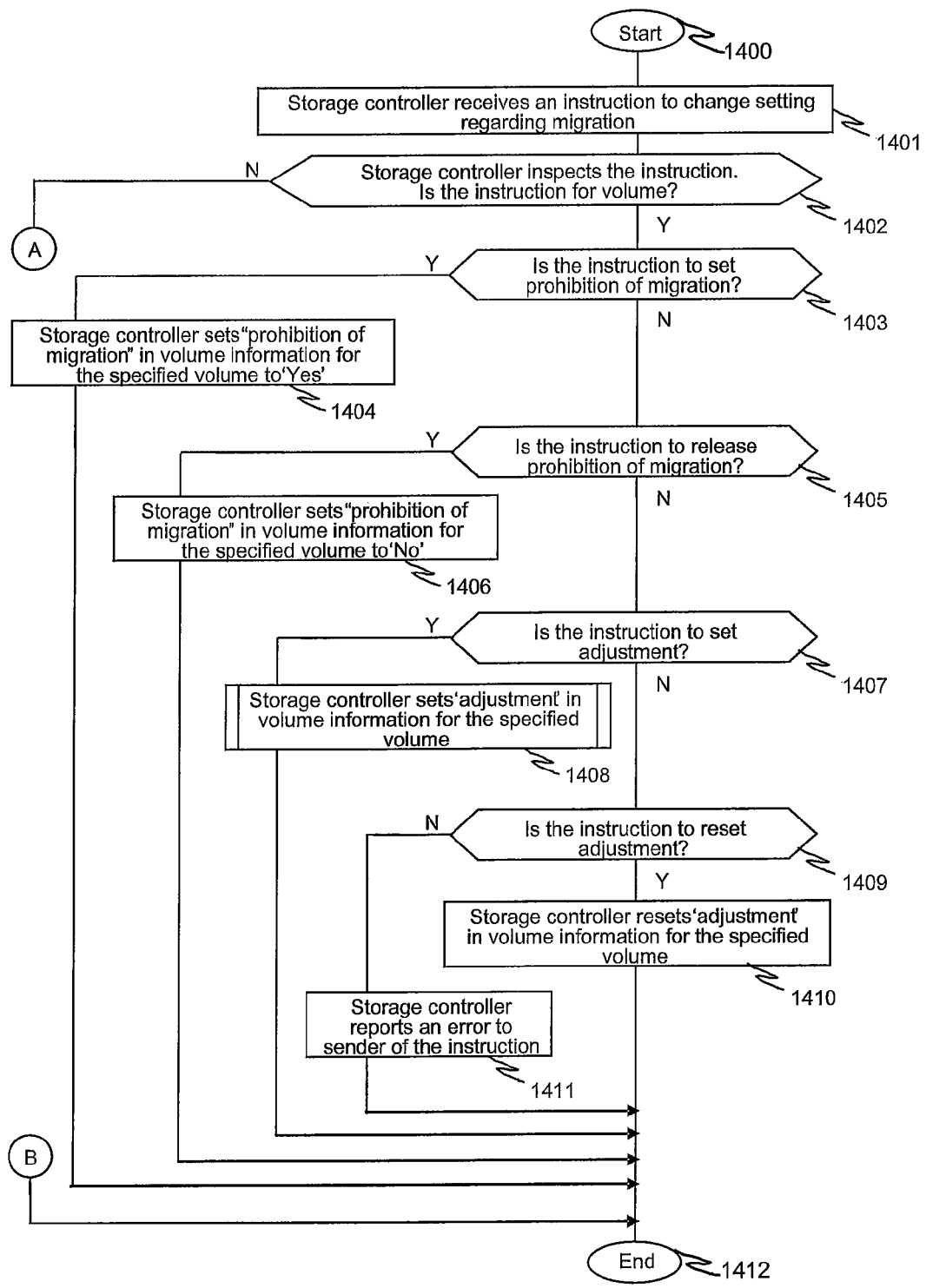
FIG. 18, FIG. 19, FIG. 20 and FIG. 21 show flowcharts of exemplary processes for changing the information regarding the migration decision process of FIG. 17.

FIG. 18, FIG. 19, FIG. 20 and FIG. 21 show flowcharts of exemplary processes for changing the information regarding the migration decision process of FIG. 17. Specifically, FIG. 18 shows a flowchart of an exemplary process for changing migration settings for a volume, according to aspects of the present invention, pertaining to the first embodiment.

In FIG. 18, the process occurs in response to the storage controller 110 receiving an instruction to change the settings of migration.

At 1400, the process begins.

At 1401, the storage controller 110 receives an instruction to change the settings applicable to migration. This means that the storage system 100 provides an interface (e.g. API) for changing the settings. As mentioned above, the file server 510, the host 500 and the other computers may issue the setting change instruction using the interface. The instruction to change setting can be transferred via the SAN 900 and/or the LAN 920 because the interface can be implemented in various manners such as a SCSI command on FC and XML on HTTP. That is, the storage controller 110 may receive the setting change instruction in various manners.

At 1402, the storage controller 110 inspects the instruction. The instruction includes information or parameters that are used for the following steps. In this step, if the instruction is determined to be for a volume, the process proceeds to 1403. Otherwise, the process proceeds to A which leads to 1601 in FIG. 20.

At 1403, if the instruction is to set prohibition of migration, the process proceeds to 1404. Otherwise, the process proceeds to 1405.

At 1404, the storage controller 110 sets the flag of prohibition of migration for the specified volume in the volume information 204 to 'YES'. After that, the process terminates at 1412.

At 1405, if the instruction is to release the prohibition of migration, the process proceeds to 1406. Otherwise, the process proceeds to 1407.

At 1406, the storage controller 110 sets the flag of prohibition of migration for the specified volume in the volume information 204 to 'NO'. There is no prohibition on migration in effect and, after that, the process terminates at 1412.

At 1407, if the instruction is to set adjustments for the volume, the process proceeds to 1408. Otherwise, the process proceeds to 1409.

At 1408, the storage controller 110 sets adjustment values for the specified volume in the volume information 204 according to the instruction. Setting of the adjustment values is described in detail further below. After setting of the adjustments at 1408, the process terminates at 1412.

At 1409, if the instruction is to reset adjustment values, the process proceeds to 1410. Otherwise, the process proceeds to 1411.

At 1410, the storage controller 110 resets adjustment values for the specified volume in the volume information 204 to initial values. After that, the process terminates at 1412.

At 1411, the storage controller 110 reports an error regarding the instruction to the sender of the instruction and, after that, the process terminates at 1412. The process of FIG. 18 arrives at the error message at 1411, if the instructions received pertain to a volume, do not require setting of prohibition of migration, do not require release of prohibition of migration, do not require adjustments to the conditions, and do not require resetting of the adjustments. In short, they instruct nothing particular to be done.

Figure 19:
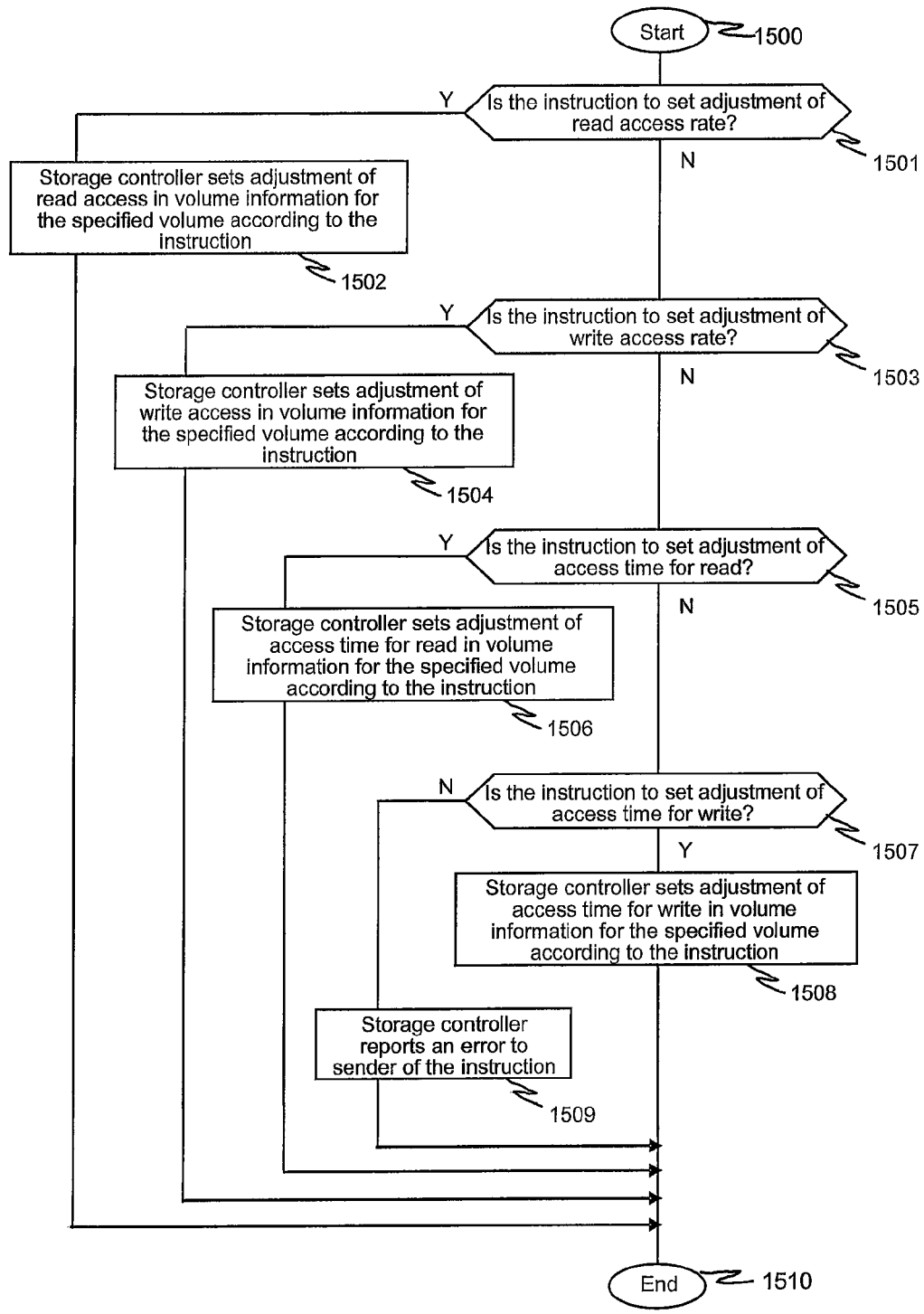

FIG. 19 shows a flowchart for an exemplary process of setting adjustment values in volume information, according to aspects of the present information. Specifically, FIG. 19 shows the details of the process performed in 1408 of FIG. 18 for setting adjustment values in the volume information 204. This process begins at 1500.

At 1501, if the instruction is to set adjustment of read access rate, the process proceeds to 1502. Otherwise, the process proceeds to 1503.

At 1502, the storage controller 110 sets adjustment of read access rate for the specified volume in the volume information 204 according to the instruction and the process terminates at 1510.

At 1503, if the instruction is to set adjustment of write access rate, the process proceeds to 1504. Otherwise, the process proceeds to 1505.

At 1504, the storage controller 110 sets adjustment of write access rate for the specified volume in the volume information 204 according to the instruction and the process terminates at 1510.

At 1505, if the instruction is to set adjustment of last access time of read access, the process proceeds to 1506. Otherwise, the process proceeds to 1507.

At 1506, the storage controller 110 sets adjustment of last access time of read access for the specified volume in the volume information 204 according to the instruction and the process terminates at 1510.

At 1507, if the instruction is to set adjustment of access time of write access, the process proceeds to 1508. Otherwise, the process proceeds to 1509.

At 1508, the storage controller 110 sets adjustment of last access time of write access for the specified volume in the volume information 204 according to the instruction and the process ends at 1510.

At 1509, the storage controller 110 reports an error regarding the instruction to the sender of the instruction and the process terminates at 1510. The process 1408 of FIG. 18 arrives at the error message at 1509, if the instruction is not for setting adjustment of read or write access rates, nor for setting adjustment of last access time for read or write operations.

Figure 20:
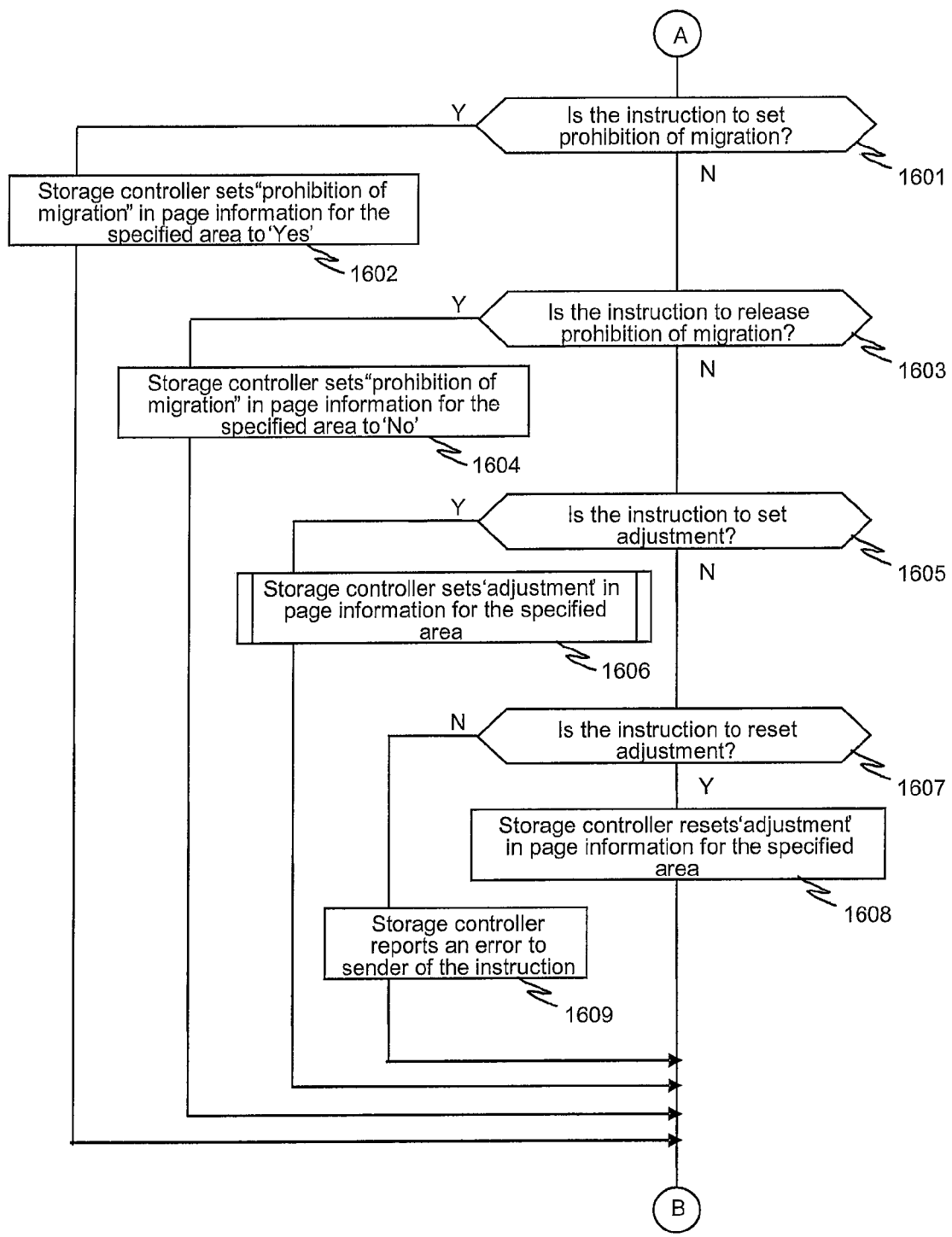

FIG. 20 shows a flowchart of an exemplary process for changing migration settings for a segment, according to aspects of the present invention pertaining to the first embodiment. Specifically, FIG. 20 shows the details of the process performed after 1402 of FIG. 18 for setting adjustment values in the page information 203. As such, FIG. 20 shows a part of the process to change settings used for migration of FIG. 18. This part is similar to the part shown in FIG. 18 pertaining to volumes except that the process shown in FIG. 20 changes the information about a specified segment, as opposed to a volume.

Figure 21:
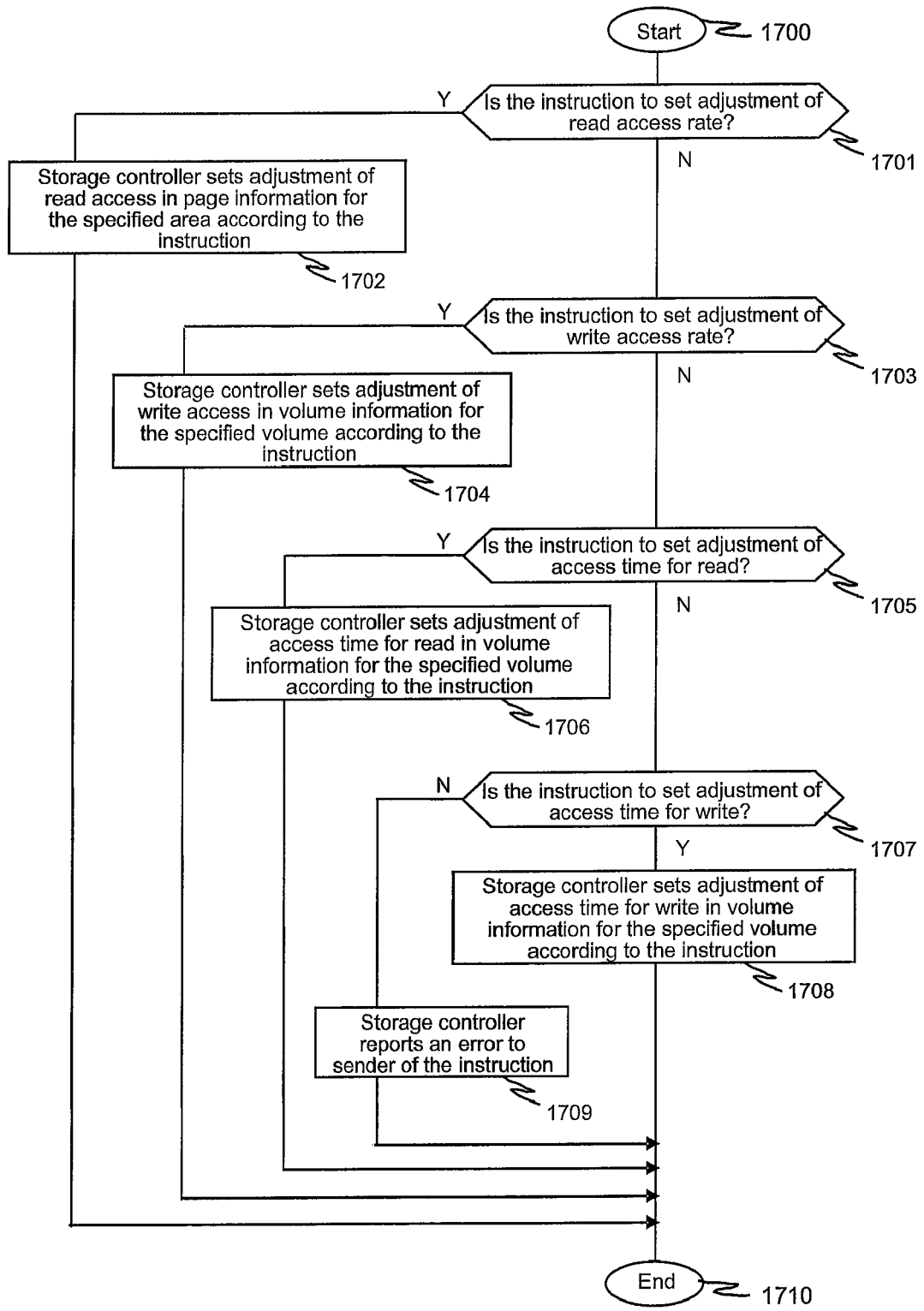

FIG. 21 shows a flowchart for an exemplary process of setting adjustment values in page or segment information, according to aspects of the present information. Specifically, FIG. 21 is the detailed process performed at 1606 of FIG. 20 and is similar to the process described in FIG. 19 except that it changes the information about the specified segment, not volume. That is, with the process illustrated in FIG. 20 and FIG. 21, the page information 203 is changed according to the instruction received.

With the process described above, the file server 510, the host 500 and the other computers can change the settings regarding migration from either the page or volume perspective. Because these settings affects the decision regarding migration, computers such as the host 500 are provided with a method to control automated page-based management or tier management performed by the storage system 100.

As another example of setting change instruction and process, plural settings can be changed by one instruction.

Figures 22, 23:
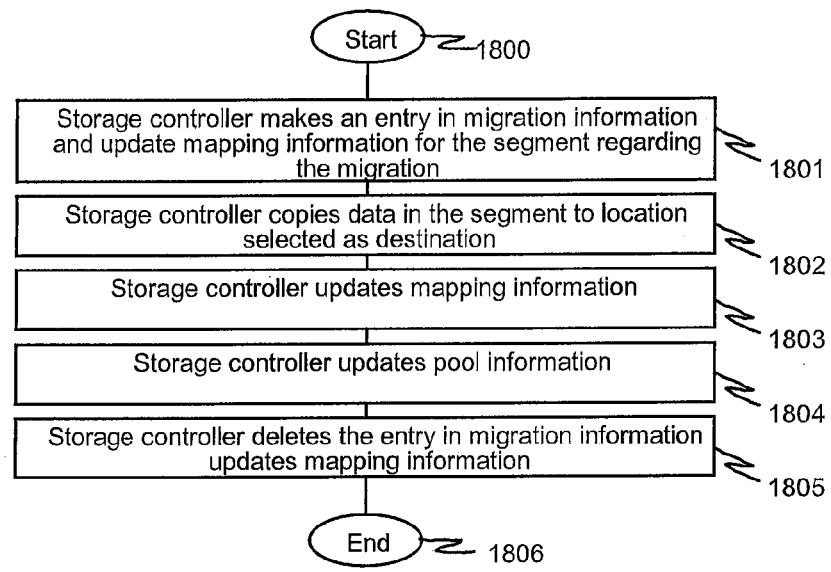
FIG. 22 shows a flowchart of an exemplary migration process according to aspects of the present invention pertaining to the first embodiment.
FIG. 23 shows exemplary migration information according to aspects of the present invention pertaining to the first embodiment.

FIG. 22 shows a flowchart of an exemplary migration process according to aspects of the present invention pertaining to the first embodiment. FIG. 23 shows exemplary migration information according to aspects of the present invention pertaining to the first embodiment.

Specifically, FIG. 22 illustrates the migration process performed in 1312 of FIG. 17. FIG. 23 shows an example of the migration information 207. Migration information 207 includes ID of the segment to be moved, information regarding the unused location selected as destination and copy pointer that denotes progress of copy.

The process of migration begins at 1800. At 1801, storage controller 110 makes an entry in migration information 207 for the segment to be moved. The storage controller 110 also sets a flag of "under migration" for the segment in the mapping information 201 to 'YES'.

At 1802, the storage controller 110 copies data in the segment to a location selected as destination. According to progress of the copying, copy pointer in the migration information 207 is updated and moves forward.

At 1803, after completion of the copying, the storage controller 110 updates the mapping information 201 to change mapping between the segment and physical location according to the migration. This realizes the transparent migration of the segment for the host 500.

At 1804, the storage controller 110 updates the pool information 202 to release the chunk that was being used by the segment if no segment is currently using the chunk.

At 1805, the storage controller 110 deletes the entry in the migration information 207 and updates the mapping information 201 to set the flag of "under migration" for the segment to 'NO.'

At 1806, the migration process terminates.

Figure 24:
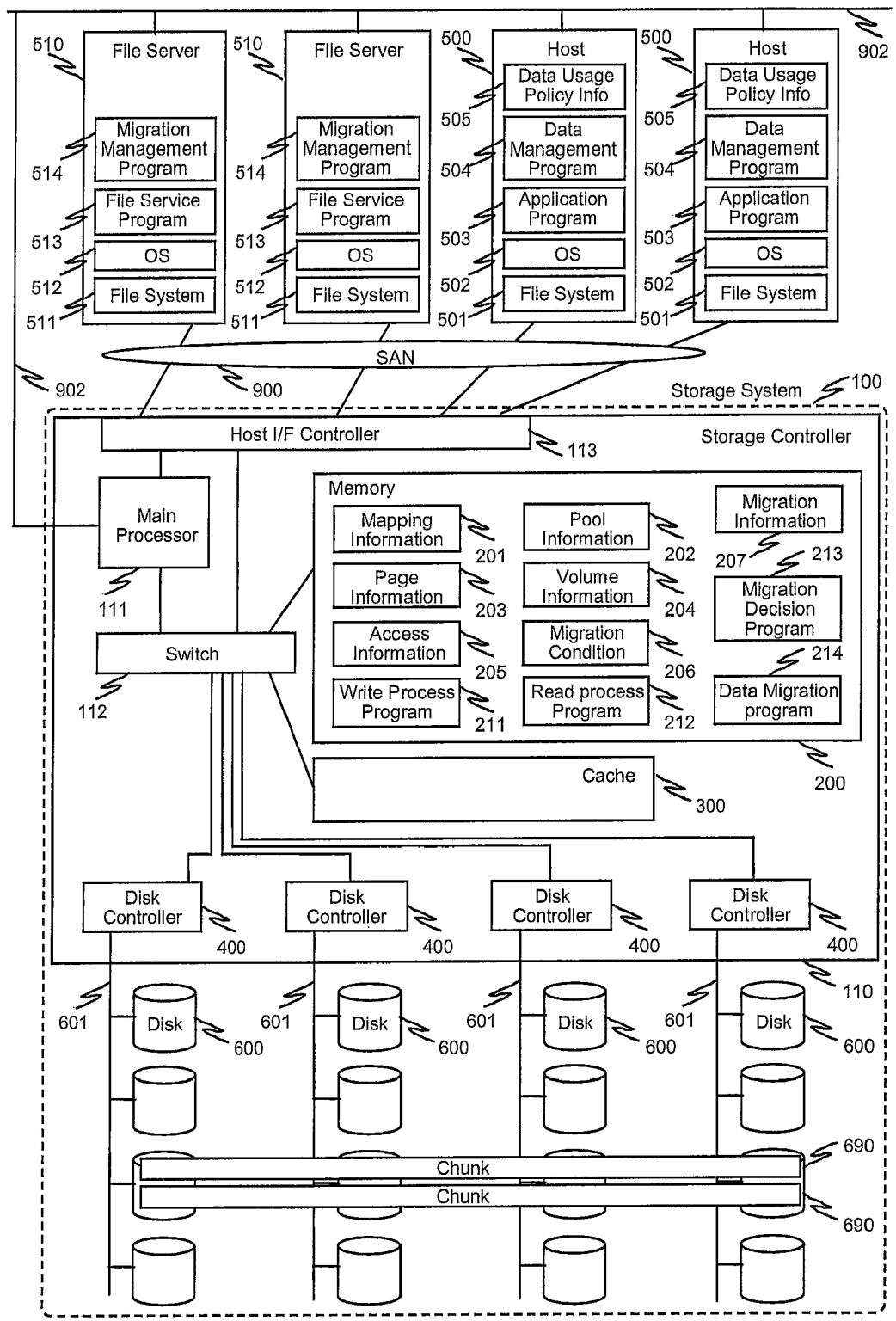
FIG. 24 shows another exemplary system configuration according to aspects of the present invention pertaining to the first embodiment.

FIG. 24 shows another exemplary system configuration according to aspects of the present invention pertaining to the first embodiment. In the alternative configuration of FIG. 24, the hosts 500 are coupled to the host interface 113 of the storage controller 100 via the SAN 900. The connection may be through Fibre Channel or iSCSI(IP). In other words, in the system of FIG. 24 there is a SAN-type coupling between the host 500 and the storage system 100 whereas in FIG. 1, only the file server 510 was coupled to the storage system 100 via the SAN 900.

In the previous configuration shown in FIG. 1, the host 500 controls the automated page-based management performed by the storage system 100 via the file server 510 because the file server manages and recognize location of each file (i.e. data). However the host 500 also can recognize the location of data when the host 500 handles the data with raw access or block access. In other words, the host 500 can store the data in the TPV 610 provided by the storage system 100 with block access and can know the location of the data in the TPV 610.

Therefore with the configuration shown in FIG. 24, in order to control automated page-based management in the storage system 100, the host 500 instructs the storage system 100 to change settings regarding migration via the SAN 900 and/or the LAN 902 directly. Moreover, other type of computers such as a management server also can control the storage system 100 through the SAN 900 and/or the LAN 902.

Figure 26:
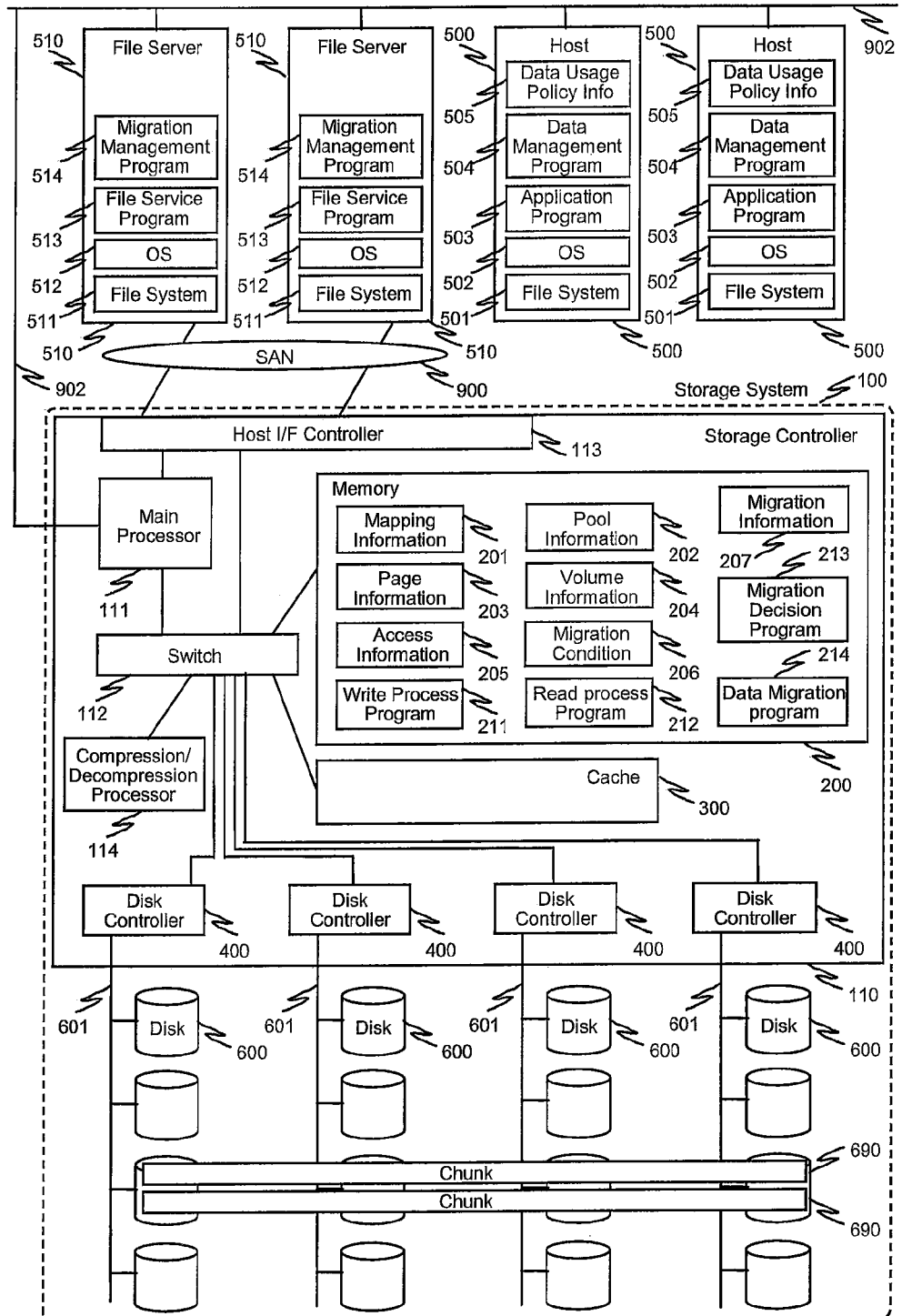
FIG. 26 shows a system configuration according to aspects of the present invention pertaining to a second embodiment.

FIG. 26 shows a system configuration according to aspects of the present invention pertaining to a second embodiment. FIG. 27 shows an exemplary mapping information 201 for use with the system configuration according to the second embodiment of the present invention. FIG. 28 shows an exemplary pool information 202 for use with the system configuration according to the second embodiment of the present invention.

Figure 29:
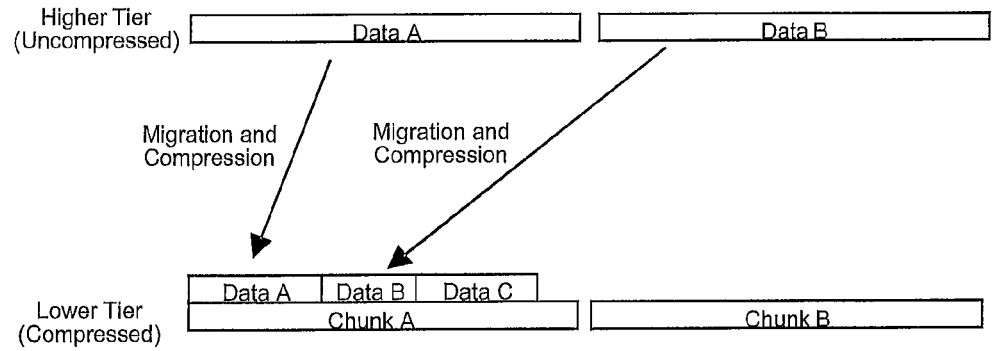
FIG. 29 shows compression/decompression capability in migration between higher tier and lower tier.

In the system of FIG. 26, a storage controller 110a includes a compression/decompression processor 114. With the compression/decompression processor 114, the storage controller 110a can compress and decompress data stored in a storage system 100a, especially for migration between tiers. As shown in FIG. 29, the data relocated to a lower tier is compressed in order to achieve more effective use of capacity. This realizes advanced tier management because compression of lower tire improves capacity cost by virtual expansion of capacity.

Data to be compressed should be selected or screened because compression and decompression causes overhead, load and latency in the process of the storage system 100a. In other words, control of tier management with compression is desired. For example, data that requires relatively high service level, even if in a lower tier, should not be compressed. As another example, some types of files such as JPEG files and MPEG files should not be compressed because a file of these types generally does not achieve large reduction of size with compression.

As shown in FIG. 29, in a compressed lower tier, one chunk (e.g. Chunk A) may have data of multiple segments (e.g. Data A, Data B and Data C). In order to manage such a relationship, an exemplary of mapping information 201 shown in FIG. 27 includes information regarding start address in a chunk and length of each segment. Moreover, an exemplary pool information 202 shown in FIG. 28 has information about number of segments in each chunk and ID information of each segment included a chunk. The mapping information 201 also includes information indicating whether the segment has been compressed or not.

Figure 30:
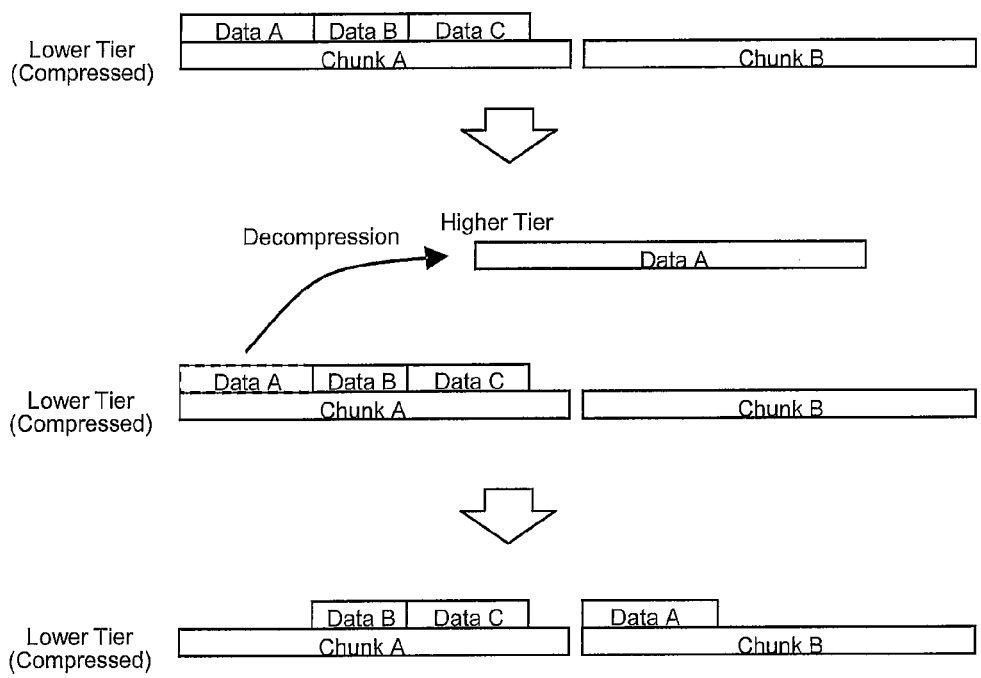
FIG. 30, FIG. 31 and FIG. 32 show three exemplary methods for processing data with compression/decompression for page-based tier management and write access according to the second embodiment of the present invention.
Figure 31:
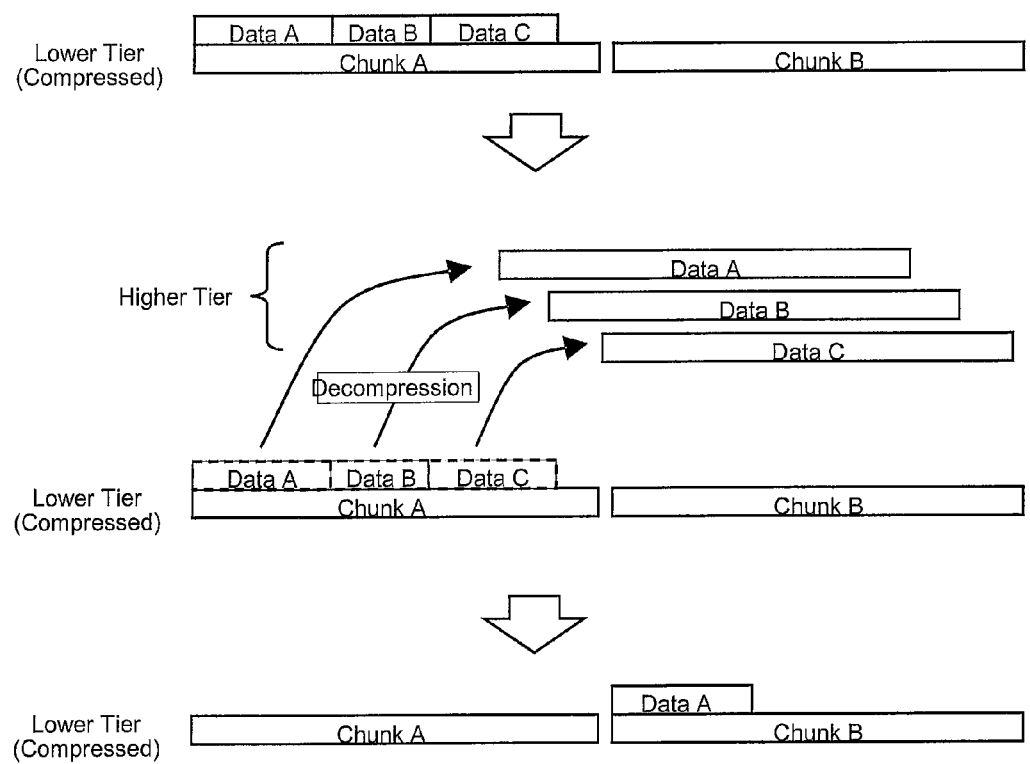
Figure 32:
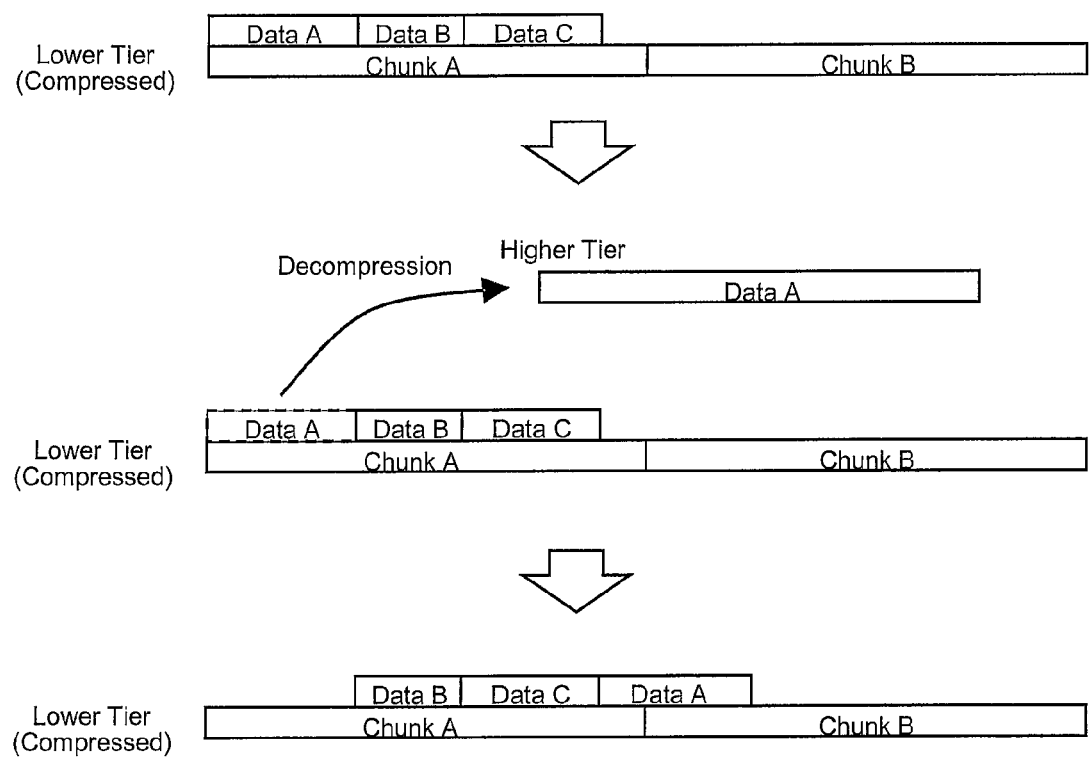

FIG. 30, FIG. 31 and FIG. 32 show three exemplary methods for processing data with compression/decompression for page-based tier management and write access according to second embodiment of the present invention.

Specifically, FIG. 30 illustrates one example of the data processing method with compression and decompression. In FIG. 30, the storage controller 110 does not store data of one segment in two or more chunks beyond the edge of a chunk. In other words, each segment goes to one chunk and is not divided between chunks. One chunk may include data from multiple segments but data of none of the segments goes beyond the chunk to the next chunk. Moreover, if one chunk has data of multiple segments, the storage controller 110 decompresses just data of the segment to be moved to higher tier and relocates it while leaving other data still compressed in the chunk when the migration happens.

FIG. 31 illustrates another example of the data processing method with compression and decompression. In FIG. 31, the storage controller 110 again does not store data of one segment in two or more chunks beyond edge of a chunk. However, in this example, if one chunk has data of multiple segments, the storage controller 110a decompresses data of all segments in the chunk and relocates them when the migration of data in the chunk happens. Therefore the chunk becomes unused immediately and can be released at the point in time.

FIG. 32 illustrates yet another example of the data processing method with compression and decompression. In FIG. 32, unlike the previous two methods, the storage controller 110 may divide data of one segment and may store the data in two chunks beyond edge of the chunks. If one chunk has data of multiple segments, the storage controller 110 decompresses just data of segment to be moved to the higher chunk and relocates this data while leaving the other data compressed and remaining in the chunk when the migration happens. This method avoids wasting storage capacity of chunks.

FIG. 33 shows an exemplary mapping information 201 for the method of FIG. 32 according to the second embodiment of the present invention. In addition to information regarding the number of chunks for each segment, with this mapping information, the same segment can have multiple locations in multiple chunks.

FIG. 34 and FIG. 35 show exemplary page information and volume information according to the second embodiment of the present invention. As mentioned above, it should be controlled whether data of one segment (or volume) is compressed or not. FIG. 34 and FIG. 35 show examples of page information 203 and volume information 204 for the second embodiment. These information are similar to the page information 203 and volume information 204 described for the first embodiment of FIG. 1, except that each of 203 and 204 includes a flag of prohibition of compression. The initial value of the flag is 'NO.' This flag can be changed according to a process described below with respect to FIG. 36.

Figure 36:
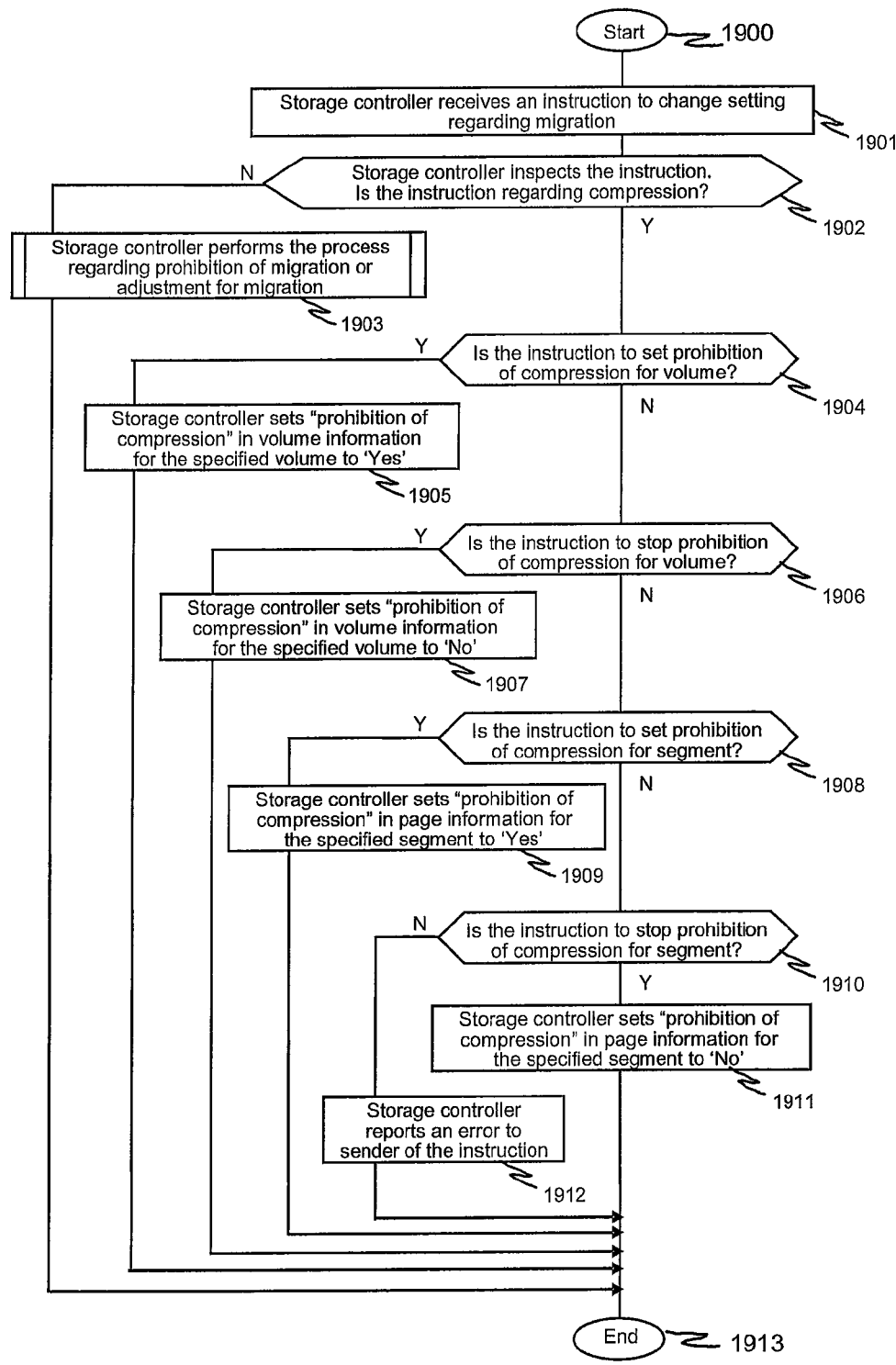
FIG. 36 shows a flowchart for a process of changing information pertaining to compression in migration according to the second embodiment of the present invention.

FIG. 36 shows a flowchart for a process of changing information pertaining to compression in migration according to the second embodiment of the present invention. The process begins at 1900. At 1901, the storage controller 110 receives an instruction to change setting of migration. This means that the storage system 100 provides an interface (e.g. API) for changing the setting. As mentioned above, the file server 510, the host 500 and other computers issue the instruction using the interface. The instruction can be transferred via SAN 900 and/or LAN 920 since the interface can be implemented in various manners such as SCSI command on FC and XML on HTTP. That is, the storage controller 110 may receive the instruction in various manners.

At 1902, the storage controller 110 checks the instruction. The instruction includes information or parameters mentioned in the following decision steps of this process. In this step, if the instruction is about compression, the process proceeds to 1904. Otherwise, the process proceeds to 1903.

At 1903, the storage controller 110 performs the process of prohibition of migration or adjustment for migration described in FIG. 18, FIG. 19, FIG. 20 and FIG. 21 and, after that, the process terminates at 1913.

At 1904, if the instruction is to set prohibition of compression for the volume, the process proceeds to 1905. Otherwise, the process proceeds to 1906.

At 1905, the storage controller 110 sets a flag of prohibition of compression for the specified volume in volume information 204 to 'YES' and then the process terminates at 1913.

At 1906, if the instruction is to stop prohibition of compression for the volume, the process proceeds to 1907. Otherwise, the process proceeds to 1908.

At 1907, the storage controller 110 sets a flag of prohibition of compression for the specified volume in volume information 204 to 'NO' and then the process terminates at 1913.

At 1908, if the instruction is to set prohibition of compression for segment, the process proceeds to 1909. Otherwise, the process proceeds to 1910.

At 1909, the storage controller 110 sets a flag of prohibition of compression for the specified segment in page information 203 to 'Yes' and then the process terminates at 1913.

At 1910, if the instruction is to stop prohibition of compression for segment, the process proceeds to 1911. Otherwise, the process proceeds to 1912.

At 1911, the storage controller 110 sets a flag of prohibition of compression for the specified segment in page information 203 to 'NO' and then the process ends.

At 1912, the storage controller 110 reports an error regarding the instruction to the sender of the instruction and, after that, the process terminates at 1913.

Migration decision process and migration process of this embodiment are similar to the processes described with respect to the first embodiment. In this embodiment, in step 1311 of FIG. 17, the storage controller 110 refers to a flag of prohibition of compression in the page information 203 for the segment to be relocated and a flag of prohibition of compression in the volume information 204 for the volume having the chunk, before selecting the destination. Then, the storage controller 110 chooses the destination according to the result of the checking of the flags. With regard to the migration process following the decision, in step 1802 of FIG. 22, the storage controller 110 copies data with compressing or decompressing the data if compression or decompression is needed. As mentioned above, this compression/decompression capability can achieve better per capacity cost in tiered storage management because of virtual expansion of capacity.

As example of method to use the compression/decompression capability, application of the capability may be selectable. That is, application of compression to lower tier is selected by user initially, and then, the setting control mentioned above can be applied.

By applying the processes described in the above embodiments, highly optimized, appropriate data placement and data relocation in the computer system are realized because computers such as the host 500, the file server 510 and the management server can control the storage system's 100 automated page-based management from their own perspective with their own information such as data usage policy and application information.

Figure 37:
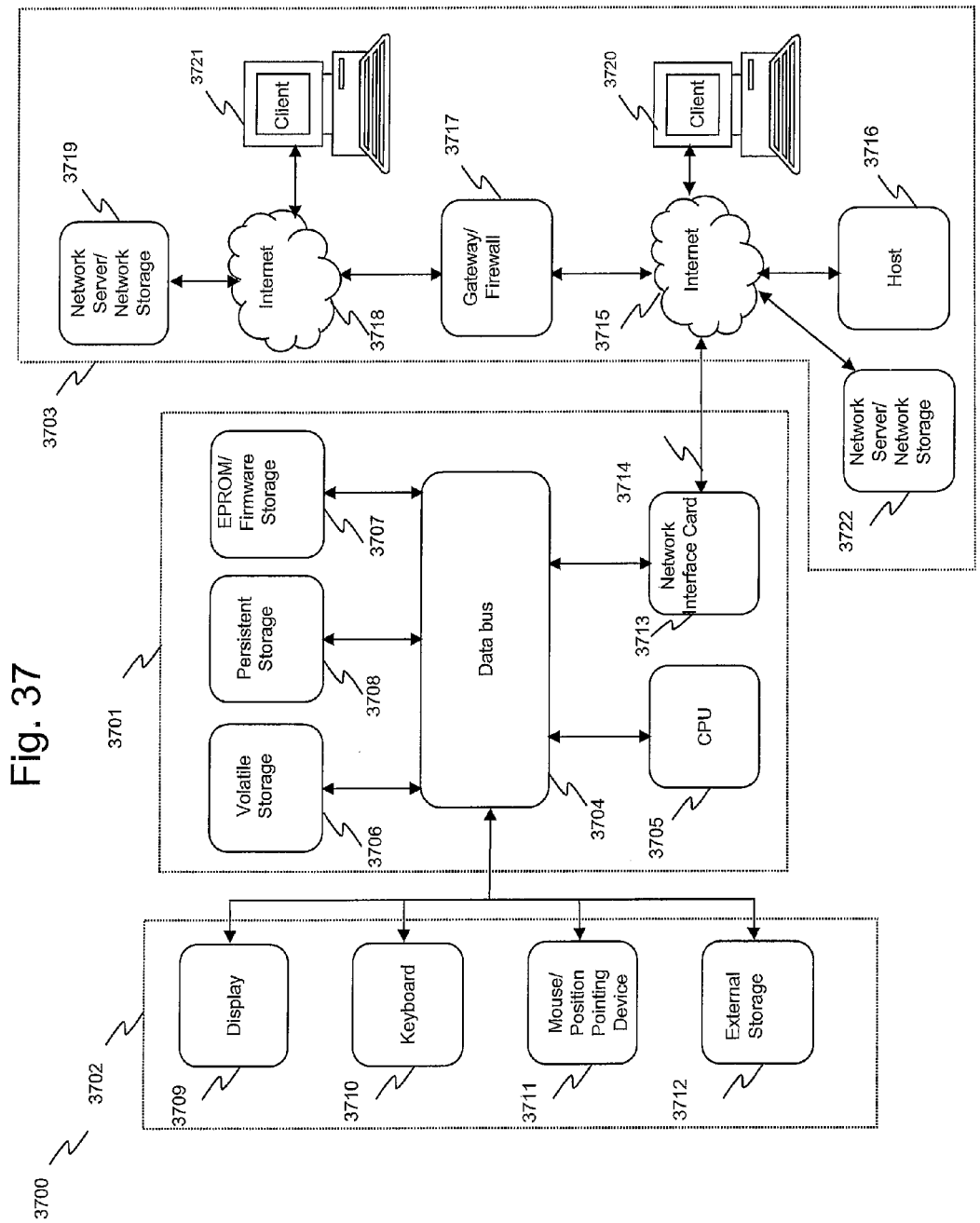
FIG. 37 shows an exemplary embodiment of a computer platform upon which the inventive system may be implemented.

FIG. 37 is a block diagram that illustrates an embodiment of a computer/server system 3700 upon which an embodiment of the inventive methodology may be implemented. The system 3700 includes a computer/server platform 3701, peripheral devices 3702 and network resources 3703.

The computer platform 3701 may include a data bus 3704 or other communication mechanism for communicating information across and among various parts of the computer platform 3701, and a processor 3705 coupled with bus 3701 for processing information and performing other computational and control tasks. Computer platform 3701 also includes a volatile storage 3706, such as a random access memory (RAM) or other dynamic storage device, coupled to bus 3704 for storing various information as well as instructions to be executed by processor 3705. The volatile storage 3706 also may be used for storing temporary variables or other intermediate information during execution of instructions by processor 3705. Computer platform 3701 may further include a read only memory (ROM or EPROM) 3707 or other static storage device coupled to bus 3704 for storing static information and instructions for processor 3705, such as basic input-output system (BIOS), as well as various system configuration parameters. A persistent storage device 3708, such as a magnetic disk, optical disk, or solid-state flash memory device is provided and coupled to bus 3701 for storing information and instructions.

Computer platform 3701 may be coupled via bus 3704 to a display 3709, such as a cathode ray tube (CRT), plasma display, or a liquid crystal display (LCD), for displaying information to a system administrator or user of the computer platform 3701. An input device 3710, including alphanumeric and other keys, is coupled to bus 3701 for communicating information and command selections to processor 3705. Another type of user input device is cursor control device 3711, such as a mouse, a trackball, or cursor direction keys for communicating direction information and command selections to processor 3704 and for controlling cursor movement on display 3709. This input device typically has two degrees of freedom in two axes, a first axis (e.g., x) and a second axis (e.g., y), that allows the device to specify positions in a plane.

An external storage device 3712 may be coupled to the computer platform 3701 via bus 3704 to provide an extra or removable storage capacity for the computer platform 3701. In an embodiment of the computer system 3700, the external removable storage device 3712 may be used to facilitate exchange of data with other computer systems.

The invention is related to the use of computer system 3700 for implementing the techniques described herein. In an embodiment, the inventive system may reside on a machine such as computer platform 3701. According to one embodiment of the invention, the techniques described herein are performed by computer system 3700 in response to processor 3705 executing one or more sequences of one or more instructions contained in the volatile memory 3706. Such instructions may be read into volatile memory 3706 from another computer-readable medium, such as persistent storage device 3708. Execution of the sequences of instructions contained in the volatile memory 3706 causes processor 3705 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 3705 for execution. The computer-readable medium is just one example of a machine-readable medium, which may carry instructions for implementing any of the methods and/or techniques described herein. Such a medium may take many forms, including but not limited to, non-volatile media, volatile media. Non-volatile media includes, for example, optical or magnetic disks, such as storage device 3708. Volatile media includes dynamic memory, such as volatile storage 3706.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge as described hereinafter, or any other medium from which a computer can read.

Various forms of computer readable media may be involved in carrying one or more sequences of one or more instructions to processor 3705 for execution. For example, the instructions may initially be carried on a magnetic disk from a remote computer. Alternatively, a remote computer can load the instructions into its dynamic memory and send the instructions over a telephone line using a modem. A modem local to computer system 3700 can receive the data on the telephone line and use an infra-red transmitter to convert the data to an infra-red signal. An infra-red detector can receive the data carried in the infra-red signal and appropriate circuitry can place the data on the data bus 3704. The bus 3704 carries the data to the volatile storage 3706, from which processor 3705 retrieves and executes the instructions. The instructions received by the volatile memory 3706 may optionally be stored on persistent storage device 3708 either before or after execution by processor 3705. The instructions may also be downloaded into the computer platform 3701 via Internet using a variety of network data communication protocols well known in the art.

The computer platform 3701 also includes a communication interface, such as network interface card 3713 coupled to the data bus 3704. Communication interface 3713 provides a two-way data communication coupling to a network link 3714 that is coupled to a local network 3715. For example, communication interface 3713 may be an integrated services digital network (ISDN) card or a modem to provide a data communication connection to a corresponding type of telephone line. As another example, communication interface 3713 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 3713 sends and receives electrical, electromagnetic or optical signals that carry digital data streams representing various types of information.

Network link 3713 typically provides data communication through one or more networks to other network resources. For example, network link 3714 may provide a connection through local network 3715 to a host computer 3716, or a network storage/server 3717. Additionally or alternatively, the network link 3713 may connect through gateway/firewall 3717 to the wide-area or global network 3718, such as an Internet. Thus, the computer platform 3701 can access network resources located anywhere on the Internet 3718, such as a remote network storage/server 3719. On the other hand, the computer platform 3701 may also be accessed by clients located anywhere on the local area network 3715 and/or the Internet 3718. The network clients 3720 and 3721 may themselves be implemented based on the computer platform similar to the platform 3701.

Local network 3715 and the Internet 3718 both use electrical, electromagnetic or optical signals that carry digital data streams. The signals through the various networks and the signals on network link 3714 and through communication interface 3713, which carry the digital data to and from computer platform 3701, are exemplary forms of carrier waves transporting the information.

Computer platform 3701 can send messages and receive data, including program code, through the variety of network(s) including Internet 3718 and LAN 3715, network link 3714 and communication interface 3713. In the Internet example, when the system 3701 acts as a network server, it might transmit a requested code or data for an application program running on client(s) 3720 and/or 3721 through Internet 3718, gateway/firewall 3717, local area network 3715 and communication interface 3713. Similarly, it may receive code from other network resources.

The received code may be executed by processor 3705 as it is received, and/or stored in persistent or volatile storage devices 3708 and 3706, respectively, or other non-volatile storage for later execution. In this manner, computer system 3701 may obtain application code in the form of a carrier wave.

It should be noted that the present invention is not limited to any specific firewall system. The inventive policy-based content processing system may be used in any of the three firewall operating modes and specifically NAT, routed and transparent.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized system having tiered data migration functionality. It is intended that the specification and examples be considered as exemplary only, with a true scope and spirit of the invention being indicated by the following claims and their equivalents.

What is claimed is:

1. A storage system adapted to be coupled to a computer, comprising:
    a plurality of storage devices being operable to store data sent from the computer for a storage volume of a plurality of storage volumes, the storage volume comprising a first storage area, to which a first tier area of a higher tier of the plurality of storage devices is allocated, and a second storage area, to which a second tier area of a lower tier of the plurality of storage devices is allocated; and
    a storage controller being operable to control a write operation and a read operation for the storage volume and to migrate data between the higher tier and the lower tier based on at least one migration condition of the storage volume, the storage controller being operable to decompress data of the second storage area, if the storage controller migrates the data of the second storage area from the lower tier to the higher tier.

2. The storage system of claim 1, wherein a change of the at least one migration condition is performed by a request of the computer received through an interface of the storage controller.

3. The storage system of claim 2, wherein the at least one migration condition of the storage volume is different from a second migration condition of another storage volume of the plurality of storage volumes.

4. The storage system of claim 2, wherein the at least one migration condition comprises a first migration condition associated with the higher tier and a second migration condition associated with the lower tier and wherein the first migration condition is different from the second migration condition.

5. The storage system of claim 2, wherein the at least one migration condition is based on a detected or predicted usage of data stored in the storage volume.

6. The storage system of claim 1, wherein the storage volume is a thin provisioning volume, to which a tier area of a plurality of tier areas of the plurality of storage devices is allocated on a tier area basis in the write operation.

7. The storage system of claim 1, wherein the storage controller is operable to use data access information to determine whether an adjustment to at least one access parameter needs to be performed; performs, if necessary, the adjustment to the at least one access parameter; and determines whether the migration of the data between the higher tier and the lower tier needs to be performed by comparing the at least one access parameter with the at least one migration condition.

8. The storage system of claim 1, wherein the storage controller is operable to compress data of the first storage area, if the storage controller migrates the data of the first storage area from the higher tier to the lower tier.

9. The storage system of claim 8, wherein the storage volume is operable to be subject to a compression prohibition.

10. The storage system of claim 1, wherein the higher tier of the plurality of storage devices is includes a storage device using a flash memory, and the lower tier of the plurality of storage devices includes a storage device using a disk drive.

11. A computer-implemented method performed in a storage system having a storage controller and a plurality of storage devices, the computer-implemented method comprising:
managing a plurality of storage volumes;
controlling a write operation and a read operation for a storage volume of the plurality of storage volumes, the storage volume being operable to comprise a first storage area, to which a first tier area of a higher tier of the plurality of storage devices is allocated, and a second storage area, to which a second tier area of a lower tier of the plurality of storage devices is allocated;
migrating data between the higher tier and the lower tier based on at least one migration condition of the storage volume; and
compressing data of the first storage area when the storage controller migrates the data of the first storage area from the higher tier to the lower tier, whereby the compressed data is stored in the lower tier.

12. The computer-implemented method of claim 11, wherein a change of the at least one migration condition is performed by a request from a computer.

13. The computer-implemented method of claim 11, further comprising:
using data access information to determine whether an adjustment to at least one access parameter needs to be performed;
performing, if necessary, the adjustment to the at least one access parameter; and
determining whether the migration of the data between the higher tier and the lower tier needs to be performed by comparing the least one access parameter with the at least one migration condition.

14. The computer-implemented method of claim 11, further comprising decompressing data of the second storage area, if the storage controller migrates the data of the second storage area from the lower tier to the higher tier.

15. The computer-implemented method of claim 11, wherein the storage volume is a thin provisioned volume, to which a tier area of a plurality of tier areas of the plurality of storage devices is allocated on a tier area basis in response to a write access from a computer to the storage volume.

16. The computer-implemented method of claim 11, wherein the higher tier of the plurality of storage devices is includes a storage device using a flash memory, and the lower tier of the plurality of storage devices includes a storage device using a disk drive.

17. A storage system comprising:
a plurality of storage devices; and
a storage controller being operable to control a write operation and a read operation for a storage volume of a plurality of storage volumes, the storage volume being operable to comprise a first storage area, to which a first tier area of a higher tier of the plurality of storage devices is allocated, and a second storage area, to which a second tier area of a lower tier of the plurality of storage devices is allocated, the storage controller being operable to compress data of the first storage area when the storage controller migrates the data of the first storage area from the higher tier to the lower tier, whereby the compressed data is stored in the lower tier.

18. The storage system according to the claim 17:
wherein the storage controller is operable to decompress data of the second storage area when the storage controller migrates the data of the second storage area from the lower tier to the higher tier.

19. The storage system according to the claim 17:
wherein the storage controller is operable to manage the plurality of storage volumes, a first type storage device of the plurality of storage devices as the higher tier, and a second type storage device of the plurality of storage devices as the lower tier, each of the first and second type storage devices having an interface coupled to the storage controller.

20. The storage system according to the claim 17:
wherein the storage volume is a thin provisioned volume, to which a tier area of a plurality of tier areas of the plurality of storage devices is allocated on a tier area basis in response to a write access from a computer to the storage volume.

21. The storage system according to the claim 17:
wherein the second tier area of the lower tier is operable to store at least a portion of the compressed data of the first storage area and at least a portion of compressed data of the second storage area when the storage controller migrates the data of the first storage area from the higher tier to the lower tier.

22. The storage system according to claim 17:
wherein the storage volume is operable to be subject to a compression prohibition, and wherein, in a status that the storage volume is subject to the compression prohibition, the storage controller being operable to not compress the data of the first storage area, even when the storage controller migrates the data of the first storage area from the higher tier to the lower tier.

23. The storage system according to the claim 17:
wherein the higher tier of the plurality of storage devices is includes a storage device using a flash memory, and the lower tier of the plurality of storage devices includes a storage device using a disk drive.

24. A storage system comprising:
a first type storage device;
a second type storage device of a lower performance attribute than the first type storage device; and
a storage controller being operable to control a write operation and a read operation for a storage volume of a plurality of storage volumes, the storage volume being operable to comprise a first storage area, to which a first area of the first type storage device is allocated, and a second storage area, to which a second area of the second type storage device is allocated, the storage controller being operable to decompress data of the second storage area when the data of the second storage area is migrated from the second type storage device to the first type storage device.

25. The storage system according to the claim 24:
wherein the storage controller is operable to compress data of the first storage area when the data of the first storage area is migrated from the first type storage device to the second type storage device.

26. The storage system according to the claim 24:
wherein each of the first and second type storage devices has an interface coupled to the storage controller.

27. The storage system according to the claim 24:
wherein the storage volume is a thin provisioned volume, to which an area of a plurality of areas of the first and second type storage devices is allocated on an area basis in response to a write access from a computer to the storage volume.

28. The storage system according to the claim 24:
wherein the second area of the second type storage device is operable to store at least a portion of compressed data of the second storage area and at least a portion of compressed data of a third storage area of the plurality of storage volumes before migrating the data of the second storage area from the second type storage device to the first type storage device.

29. The storage system according to claim 24:
wherein the storage volume is operable to be subject to a compression prohibition, and
wherein, in a status that the storage volume is subject to the compression prohibition, the storage controller is operable to not decompress the data of the second storage area.

30. The storage system according to the claim 24:
wherein the first type storage device is a storage device using a flash memory, and the second type storage device is a disk drive.

31. A computer program stored in a computer readable storage medium and executed by a storage system comprising a storage controller and a plurality of storage devices, the computer program comprising:
code for controlling a write operation and a read operation for a storage volume of a plurality of storage volumes, the storage volume comprising a first storage area, to which a first tier area of a higher tier of the plurality of storage devices is allocated, and a second storage area, to which a second tier area of a lower tier of the plurality of storage devices is allocated; and
code for compressing data of the first storage area when the data of the first storage area is migrated from the higher tier to the lower tier, whereby the compressed data is stored in the lower tier.

32. The computer program according to the claim 31, further comprising:
code for decompressing data of the second storage area when the data of the second storage area is migrated from the lower tier to the higher tier.

33. The computer program according to the claim 31, further comprising:
code for managing the plurality of storage volumes, a first type storage device of the plurality of storage devices as the higher tier, and a second type storage device of the plurality of storage devices as the lower tier, each of the first and second type storage devices having an interface coupled to the storage controller.

34. The computer program according to the claim 31:
wherein the storage volume is a thin provisioned volume, to which a tier area of the plurality of storage devices is allocated on a tier area basis in response to a write access from a computer to the storage volume.

35. The computer program according to the claim 31, further comprising:
code for controlling to store at least a portion of the compressed data of the second storage area and at least a portion of compressed data of a third storage area of the plurality of storage volumes in the second tier area of the lower tier when the data of the first storage area is migrated from the higher tier to the lower tier.

36. The computer program according to the claim 31, further comprising:
code for not compressing the data of the first storage area if the storage volume is subject to a compression prohibition.

37. The computer program according to the claim 31, comprising:
wherein the higher tier of the plurality of storage devices is includes a storage device using a flash memory, and the lower tier of the plurality of storage devices includes a storage device using a disk drive.

38. A storage system comprising:
a plurality of storage devices; and
a storage controller having a cache memory and being operable to control a write operation and a read operation for a storage volume of a plurality of storage volumes, the storage volumes being operable to comprise a first storage area, which is operable to store data to be sent from a first tier area of a higher tier of the plurality of storage devices to a computer in response to a read request from the computer to the first storage area, and a second storage area, which is operable to store data to be sent from a second tier area of a lower tier of the plurality of storage devices to the computer in response to a read request from the computer to the second storage area, the storage controller being operable to decompress data read from the second tier area when the storage controller reads data of the second storage area, whereas the storage controller being operable to not decompress data read from the first tier area when the storage controller reads data of the first storage area.

39. The storage system according to the claim 38:
wherein the storage controller is operable to manage the plurality of storage volumes, a first type storage device of the plurality of storage devices as the higher tier, and a second type storage device of the plurality of storage device as the lower tier.

40. The storage system according to the claim 38:
wherein the storage volume is a thin provisioned volume, to which a tier area of a plurality of tier areas of the plurality of storage devices is allocated on a tier area basis in response to a write access from a computer to the storage volume.

41. The storage system according to the claim 38:
wherein the second tier area of the lower tier is operable to store at least a portion of compressed data of the second storage area and at least a portion of compressed data of a third storage area of the storage volumes.

42. The storage system according to claim 38:
wherein the storage volume is operable to be subject to a compression prohibition, and
wherein, in a status that the storage volume is subject to the compression prohibition, the storage controller is operable to not decompress the data of the second storage area.

43. The storage system according to the claim 38:
wherein the higher tier of the plurality of storage devices is includes a storage device using a flash memory, and the lower tier of the plurality of storage devices includes a storage device using a disk drive.

44. A storage system comprising:
a first type storage device including an interface coupled to a storage controller; and
a second type storage device, of a lower performance attribute than the first type storage device, and including an interface coupled to the storage controller;
the storage controller being operable to control a write operation and a read operation for a storage volume of a plurality of storage volumes, the storage volume being operable to comprise a first storage area, to which a first area of the first type storage device is allocated, and a second storage area, to which a second area of the second type storage device is allocated, the storage controller being operable to compress data of the first storage area when the storage controller migrates the data of the first storage area from the first type storage device to the second type storage device, whereby the compressed data is stored in the second type storage device.

45. The storage system according to the claim 44:
wherein the storage controller is operable to decompress data of the second storage area when the storage controller migrates the data of the second storage area from the second type storage device to the first type storage device.

46. The storage system according to the claim 44:
wherein the storage controller is operable to manage the plurality of storage volumes.

47. The storage system according to the claim 44:
wherein the storage volume is a thin provisioned volume, to which an area of a plurality of areas of the first and second storage devices is allocated on an area basis in response to a write access from a computer to the storage volume.

48. The storage system according to the claim 44:
wherein the second area of the second type storage device is operable to store at least a portion of the compressed data of the first storage area and at least a portion of compressed data of the second storage area when the storage controller migrates the data of the first storage area from the first type storage device to the second type storage device.

49. The storage system according to claim 44:
wherein the storage volume is operable to be subject to a compression prohibition, and
wherein, in a status that the storage volume is subject to the compression prohibition, the storage controller is operable to not compress the data of the first storage area, even when the storage controller migrates the data of the first storage area from the first type storage device to the second type storage device.

50. The storage system according to the claim 44:
wherein the first type storage device is a storage device using a flash memory, and the second type storage device is a disk drive.

51. A storage system comprising:
a plurality of storage devices; and
a storage controller being operable to control a write operation and a read operation for a plurality of storage volumes, the storage volumes being operable to comprise a first storage area, to which a first tier area of a higher tier of the plurality of storage devices is allocated, and a second storage area, to which a second tier area of a lower tier of the plurality of storage devices is allocated, the storage controller being operable to execute a first migration process for migrating the data of the first storage area from the higher tier to the lower tier, wherein the data is compressed during the first migration process.

52. The storage system according to the claim 51:
wherein the storage controller is operable to execute a second migration process for migrating the data of the second storage area from the lower tier to the higher tier, wherein the data to be migrated to the higher tier is decompressed during the second migration process.

53. The storage system according to the claim 51:
wherein the storage controller is operable to manage the plurality of storage volumes, a first type storage device of the plurality of storage devices as the higher tier, and a second type storage device of the plurality of storage devices as the lower tier, each of the first and second type storage devices having an interface coupled to the storage controller.

54. The storage system according to the claim 51:
wherein a storage volume of the storage volumes is a thin provisioned volume, to which a tier area of a plurality of tier areas of the plurality of storage devices is allocated on a tier area basis in response to a write access from a computer to the storage volume.

55. The storage system according to the claim 51:
wherein the second tier area of the lower tier is operable to store at least a portion of the compressed data of the first storage area and at least a portion of compressed data of the second storage area when the storage controller executes the first migration process for migrating the data of the first storage area from the higher tier to the lower tier.

56. The storage system according to claim 51:
wherein the storage volume is operable to be subject to a compression prohibition, and
wherein, in a status that the storage volume is subject to the compression prohibition, the storage controller being operable to not compress the data of the first storage area, even when the storage controller executes the first migration process of migrating the data of the first storage area from the higher tier to the lower tier.

57. The storage system according to the claim 51:
wherein the higher tier of the plurality of storage devices is includes a storage device using a flash memory, and the lower tier of the plurality of storage devices includes a storage device using a disk drive.

58. A storage system comprising:
a first type storage device;
a second type storage device having a lower performance attribute than the first type storage device; and
a storage controller being operable to control a write operation and a read operation for a plurality of storage volumes, the storage volumes being operable to comprise a first storage area, to which a first area of the first type storage device is allocated, and a second storage area, to which a second area of the second type storage device is allocated, the storage controller being operable to migrate the data of the second storage area from the second type storage device to the first type storage device and to decompress the data to be migrated.

59. The storage system according to the claim 58:
wherein the storage controller is operable to migrate the data of the first storage area from the first type storage device to the second type storage device and to compress the data to be migrated to the second type storage device.

60. The storage system according to the claim 58:
wherein each of the first and second type storage devices has an interface coupled to the storage controller.

61. The storage system according to the claim 58:
wherein a storage volume of the storage volumes is a thin provisioned volume, to which an area of a plurality of areas of the first and second type storage devices is allocated on an area basis in response to a write access from a computer to the storage volume.

62. The storage system according to the claim 58:
wherein the second area of the second type storage device is operable to store at least a portion of compressed data of the second storage area and at least a portion of compressed data of a third storage area of the plurality of storage volumes before migrating the data of the second storage area from the second type storage device to the first type storage device.

63. The storage system according to claim 58:
wherein the storage volume is operable to be subject to a compression prohibition, and
wherein, in a status that the storage volume is subject to the compression prohibition, the storage controller is operable to not decompress the data of the second storage area.

64. The storage system according to the claim 58:
wherein the first type storage device is a storage device using a flash memory, and the second type storage device is a disk drive.

* * * * *